United States Patent
Choi et al.

(10) Patent No.: US 9,801,017 B2
(45) Date of Patent: Oct. 24, 2017

(54) METHOD OF MANAGING GEO-FENCE AND ELECTRONIC DEVICE THEREOF

(71) Applicant: Samsung Electronics Co., Ltd., Gyeonggi-do (KR)

(72) Inventors: Areum Choi, Gyeonggi-do (KR); Woo-Young Kim, Gyeonggi-do (KR); Sunggyu Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/180,489

(22) Filed: Jun. 13, 2016

(65) Prior Publication Data

US 2017/0048666 A1    Feb. 16, 2017

(30) Foreign Application Priority Data

Aug. 10, 2015  (KR) .......................... 10-2015-0112658

(51) Int. Cl.
*H04W 4/02* (2009.01)
*H04W 4/00* (2009.01)

(52) U.S. Cl.
CPC ........... *H04W 4/021* (2013.01); *H04W 4/008* (2013.01); *H04W 4/023* (2013.01)

(58) Field of Classification Search
CPC ...... H04W 4/021; H04W 4/008; H04W 4/023
USPC ............... 455/456.1–3, 457, 404.2
See application file for complete search history.

(56) References Cited

U.S. PATENT DOCUMENTS

| | | | |
|---|---|---|---|
| 8,504,061 B2 | 8/2013 | Grainger et al. | |
| 8,606,260 B2 * | 12/2013 | Chatterjee | H04W 24/10 370/241 |
| 9,408,031 B1 * | 8/2016 | Steger | H04W 4/021 |
| 2012/0307645 A1 * | 12/2012 | Grosman | H04B 7/2643 370/241 |
| 2014/0066101 A1 * | 3/2014 | Lyman | H04W 4/001 455/456.3 |
| 2014/0364100 A1 | 12/2014 | Marti et al. | |
| 2015/0141037 A1 * | 5/2015 | Saha | H04W 4/021 455/456.1 |
| 2015/0163629 A1 | 6/2015 | Cheung | |
| 2015/0281889 A1 * | 10/2015 | Menendez | H04W 4/021 455/456.1 |
| 2016/0007151 A1 * | 1/2016 | Birch | H04W 4/021 455/456.3 |

(Continued)

FOREIGN PATENT DOCUMENTS

WO    2015/013099 A2    1/2015

OTHER PUBLICATIONS

European Search Report dated Oct. 11, 2016.

*Primary Examiner* — Cong Tran
(74) *Attorney, Agent, or Firm* — Cha & Reiter, LLC

(57) ABSTRACT

Disclosed are a method of managing geo-fences by an electronic device and an electronic device therefor. An operation of the electronic device may include: identifying a deletion of at least some geo-fences among a plurality of geo-fences stored in the electronic device or an addition of other geo-fences; identifying a number of remaining geo-fences among the plurality of geo-fences according to the deletion or the addition; and when the number of remaining geo-fences is larger than a number of geo-fences which can be allowed by hardware resources, grouping the remaining geo-fences as one or more geo-fence groups.

20 Claims, 25 Drawing Sheets

(56) References Cited

U.S. PATENT DOCUMENTS

2016/0094944 A1\* 3/2016 Kong .................... H04W 4/022
                                                    455/456.1
2016/0183049 A1\* 6/2016 Rotstein ................ H04W 64/00
                                                    455/456.1

\* cited by examiner

METHOD OF MANAGING GEO-FENCE AND ELECTRONIC DEVICE THEREOF

CLAIM OF PRIORITY

This application claims priority under 35 U.S.C. §119(a) to Korean Application Serial No. 10-2015-0112658, which was filed in the Korean Intellectual Property Office on Aug. 10, 2015, the entire content of which is hereby incorporated by reference.

TECHNICAL FIELD

The present disclosure relates to a method and an apparatus for managing geo-fences in an electronic device.

BACKGROUND

An electronic device (for example, a portable terminal or a mobile phone) typically includes communication systems such as a GPS, Wi-Fi, Bluetooth, BLE, sensor, Near Field Communication (NFC), and the like, and provides a user's current location and a Location Based Service (LBS).

Recently, services related to "geo-fences" have attracted users. Geo-fences are a positioning-based technology that detects entrance/exit of a device into/from a region partitioned by a virtual boundary. For example, using geo-fences, a mobile device may be able to detect when the user has entered his home.

The electronic device may configure a geo-fence and, when the electronic device enters the configured region, provide a location-based service that provides a service such as an advertisement or the like. For example, if, by using geo-fences, it is detected that the user has entered a store, then the mobile device may show advertisements related to products sold in that store.

SUMMARY

An electronic device may register at least one geo-fence for receiving a geo-fence service. Accordingly, as the number of geo-fences that provide the geo-fence service increases, the number of geo-fences to be registered in the electronic device increases and thus the electronic device reaches a limit in memories and hardware (H/W) resources.

Various embodiments of the present disclosure may provide a method and an apparatus for managing a plurality of geo-fences.

In accordance with an aspect of the present disclosure, an operation method of an electronic device is provided. The operation method includes: identifying a deletion of at least some geo-fences among a plurality of geo-fences stored in the electronic device or an addition of other geo-fences; identifying a number of remaining geo-fences among the plurality of geo-fences according to the deletion or the addition; and when the number of remaining geo-fences is larger than a number of geo-fences which can be allowed by hardware resources, grouping the remaining geo-fences as one or more geo-fence groups.

In accordance with another aspect of the present disclosure, an electronic device is provided. The electronic device includes: a first processor configured to monitor a geo-fence group; and a second processor functionally connected to the first processor, wherein the second processor is configured to transmit the geo-fence group including at least some of a plurality of geo-fences to the first processor and receive, from the first processor, a notification that the electronic device moves from an outside to an inside of one geo-fence of the geo-fence group or from the inside to the outside of the one geo-fence.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
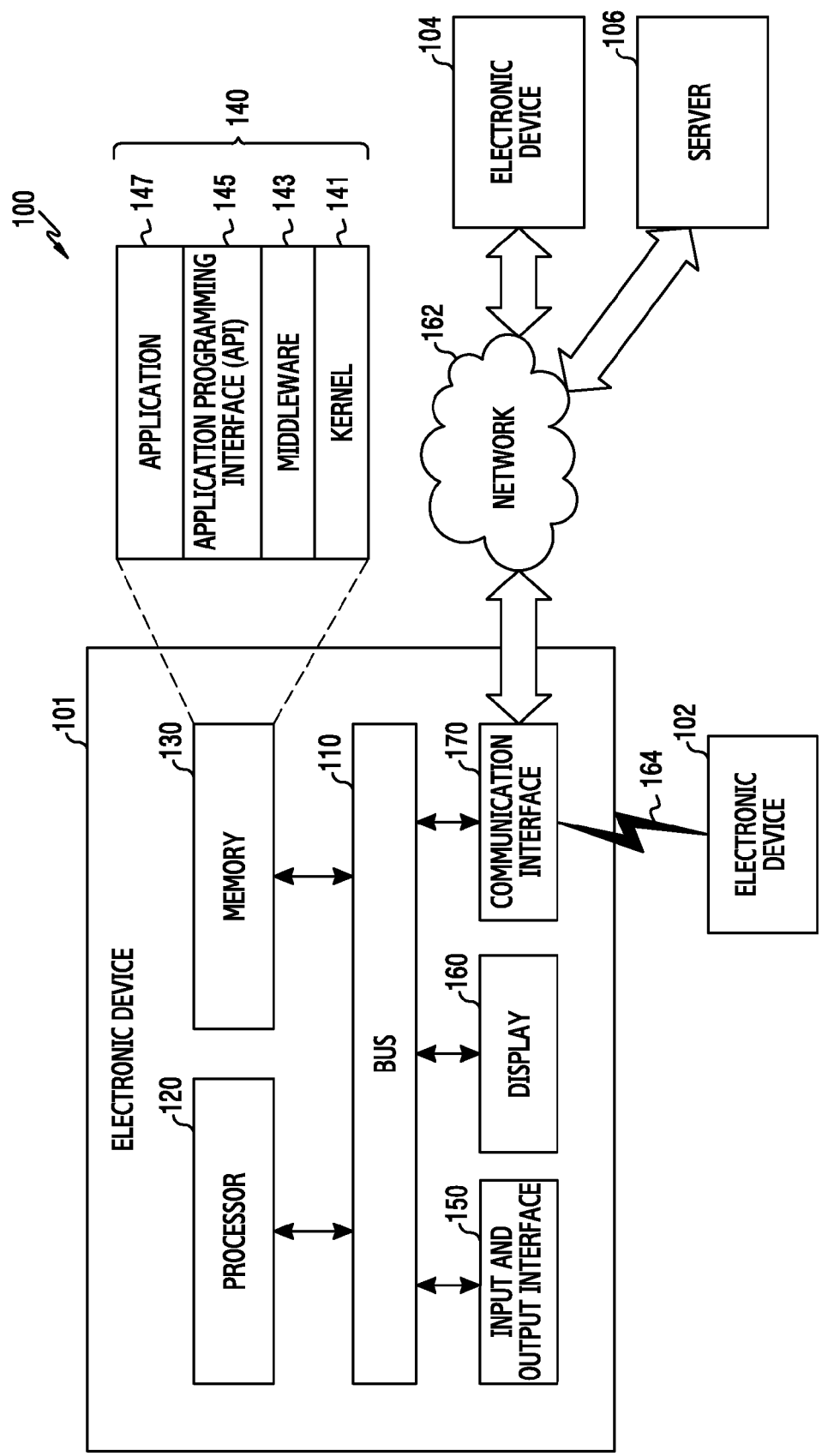
FIG. 1 illustrates a network environment including an electronic device according to various embodiments of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor(AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Hereinafter, in various embodiments of the present disclosure, a content may be generated based on configuration information that is in the form of a markup language, such as a Chemical Markup Language (CML), Hypertext Markup Language (HTML), Extensible Markup Language (XML), or the like.

Referring to FIG. 1, an electronic device 101 in a network environment 100, according to various embodiments of the present disclosure, is illustrated. The electronic device 101 may include a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). In some embodiments, the electronic device 101 may omit at least one of the above components or may further include other components.

The bus 110 may include, for example, a circuit that interconnects the components 120 to 170 and delivers communication (e.g., a control message and/or data) between the components 120 to 170.

The processor 120 may include one or more of a Central Processing Unit (CPU), an Application Processor (AP), and a Communication Processor (CP). For example, the processor 120 may carry out operations or data processing relating to control and/or communication of at least one other components of the electronic device 101. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The processor may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The memory 130 may include a volatile memory and/or a non-volatile memory. The memory 130 may store, for example, instructions or data (e.g., a reference distance) related to at least one other component. According to an embodiment, the memory 130 may store software and/or a program 140. For example, the program may include a kernel 141, a middleware 143, an Application Programming Interface API 145, an application program (or application) 147, or the like. At least some of the kernel 141, the middleware 143, and the API 145 may be referred to as an Operating System (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen and receive, for example, a touch, gesture, proximity, or hovering input by using an electronic pen or the user's body part.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include, for example, short-range communication 164. The short-range communication may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard-232 (RS-232, and a Plain Old Telephone Service (POTS). The network 162 may include at least one of a communication network such as a computer network (e.g., a LAN or a WAN), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
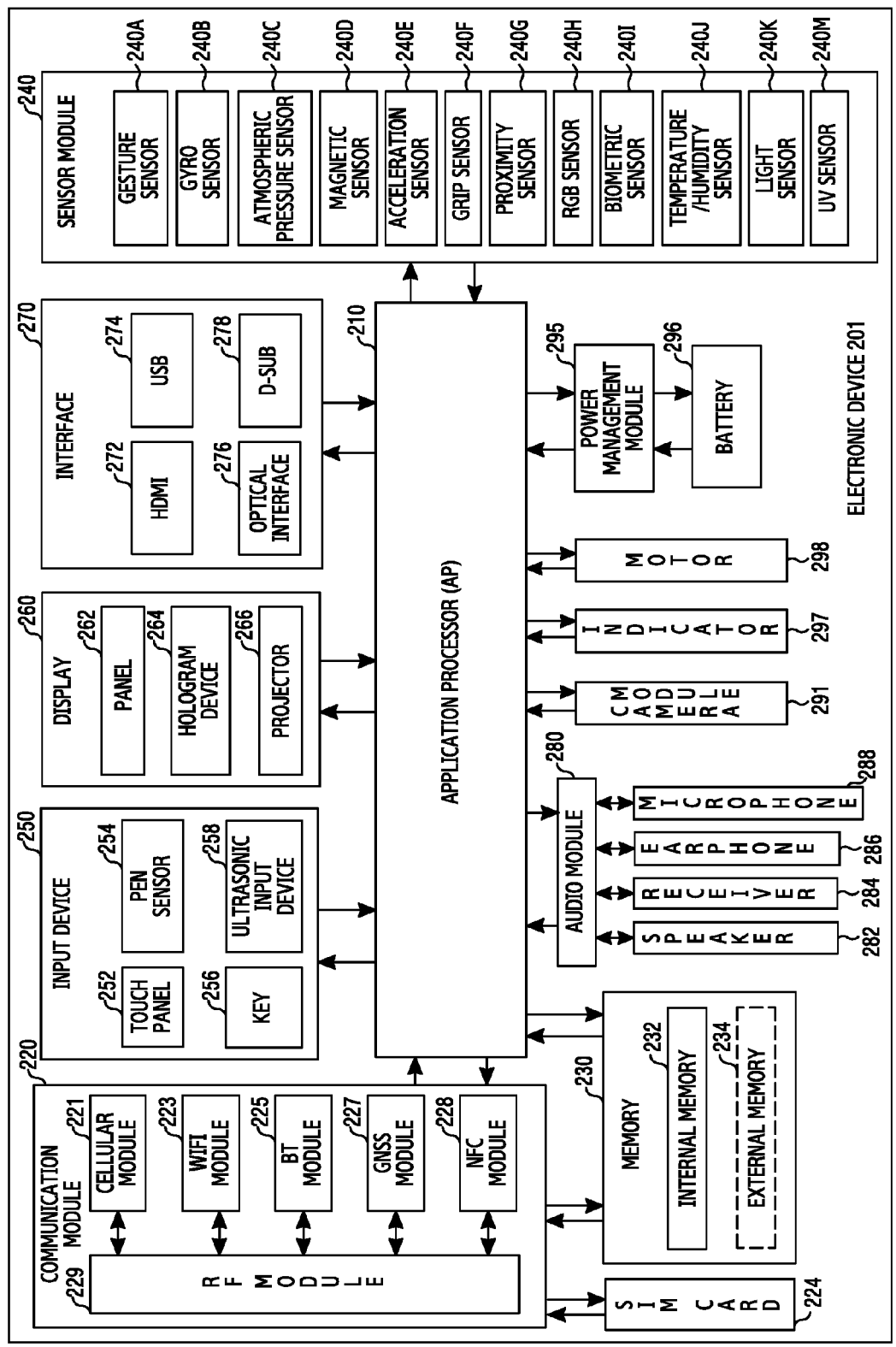
FIG. 2 is a block diagram illustrating an electronic device according to various embodiments of the present disclosure.

FIG. 2 is a block diagram of an electronic device 201 according to various embodiments. The electronic device 201 may include, for example, all or a part of the electronic device 101 illustrated in FIG. 1. The electronic device 201 may include at least one processor (for example, application processor (AP)) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software elements connected thereto and perform a variety of data processing and calculations by driving an operating system or application programs. The processor 210 may be implemented as, for example, a system on chip (SoC). According to an embodiment, the processor 210 may further include a graphic processing unit (GPU) and/or an image signal processor. The processor 210 may include at least some of the elements (e.g., a cellular module 221) illustrated in FIG. 2. The processor 210 may load commands or data, received from at least one other element (e.g., a non-volatile memory), in a volatile memory to process the loaded commands or data, and may store various types of data in the non-volatile memory. The processor 210 may load, into a volatile memory, instructions or data received from at least one (for example, a non-volatile memory) of the other elements and may process the loaded instructions or data, and may store various data in a non-volatile memory.

The communication module 220 may have a configuration that is equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide, for example, application, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The battery 396 may include, for example, a rechargeable battery or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
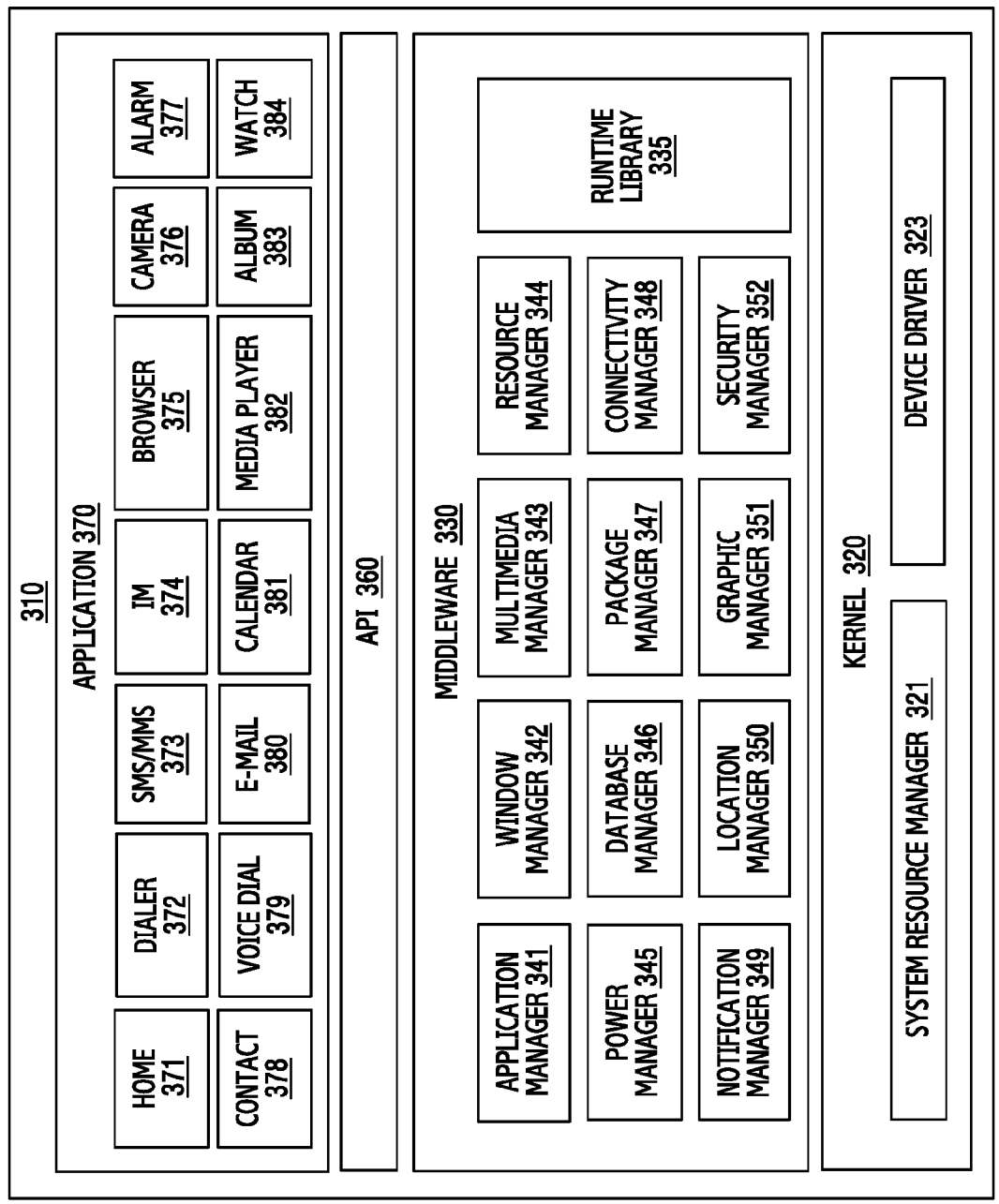
FIG. 3 is a block diagram illustrating a program module according to various embodiments of the present disclosure.

FIG. 3 is a block diagram of a program module 310 according to various embodiments. According to an embodiment, the program module 310 (e.g., the program 140) may include an operating system (OS) that controls resources relating to an electronic device (e.g., the electronic device 101 or 201) and/or various applications (e.g., the application 147) executed in the operating system. The operating system may be, for example, Android, iOS™, Windows™, Symbian™, Tizen™, Bada™, or the like.

The programming module 310 may include a kernel 320, middleware 330, an application programming interface (API) 360, and/or applications 370. At least some of the program module 310 may be preloaded in the electronic device, or may be downloaded from a external electronic device (e.g., the electronic device (102, 104), the server 106).

The kernel 320 (for example, the kernel 141) may include, for example, a system resource manager 321 and/or a device driver 323. The system resource manager 321 may perform the control, allocation, retrieval, or the like of system resources.

The middleware 330 may provide, for example, a function commonly required by the applications 370, or may provide various functions to the applications 370 through the API 360 so that the applications 370 can efficiently use limited system resources within the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module, which a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) that is appropriate for the corresponding format. The resource manager 344 may manage resources, such as a source code, a memory, a storage space, and the like of at least one of the applications 370.

The power manager 345 may operate together with, for example, a Basic Input/Output System (BIOS) or the like, so as to manage a battery or power, and may provide power information required for the operation of the electronic device. According to an embodiment of the present disclosure, the power manager 345 may control charging and discharging a battery through at least one of a wired scheme or a wireless scheme.

The database manager 346 may generate, search for, and/or change a database to be used by at least one of the applications 370. The package manager 347 may manage the installation or updating of an application distributed in the form of a package file.

The connectivity manager 348 may manage a wireless connection (for example, Wi-Fi, Bluetooth, or the like). The notification manager 349 may display or notify of an event (such as an arrival message, an appointment, a proximity notification, and the like) in such a manner not to disturb a user. The location manager 350 may manage location information of the electronic device. The graphic manager 351 may manage a graphic effect, which is to be provided to a user, or a user interface related to the graphic effect. The security manager 352 may provide various security functions required for system security, user authentication, and the like.

According to an embodiment of the present disclosure, when the electronic device (for example, the electronic device 101) includes a telephone call function, the middleware 330 may further include a telephony manager for managing an application or a video call function of the electronic device.

The middleware 330 may include a middleware module that forms a combination of various functions of the above-described components. The middleware 330 may provide a module specialized for each type of OS in order to provide a differentiated function. Also, the middleware 330 may dynamically delete some of the existing components, or may add new components.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as a home 371, a dialer 372, a SMS/MMS 373, an Instant Message (IM) 374, a browser 375, a camera 376, an alarm 377, contacts 378, a application dialer 379, an email 380, a calendar 381, a media player 382, an album 383, a clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health care application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some elements) or a function of adjusting luminance (or a resolution) of the display), applications operating in the external electronic device, or services provided by the external electronic device (for example, a call service and a message service).

According to an embodiment, the applications 370 may include a preloaded application or a third party application which can be downloaded from the server. Names of the elements of the program module 310 according to the above-illustrated embodiments may change depending on the type of OS.

According to various embodiments, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process, for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

An electronic device (for example, a portable terminal or an electronic device 101) includes a GPS, Wi-Fi, Bluetooth, BLE, sensor, Near Field Communication (NFC), and the like, and provides a user's current location and a Location Based Service (LBS).

Geo-fencing may be one of location-based Application Programming Interfaces (APIs) which are highlighted these days in which a location-based service and various functions based on the location-based service appear.

The geo-fencing is a compound word of geographic and fencing and may refer to an API that configures a geo-fence corresponding to a virtual geographic fence and notifies of an in/out event of a user with respect to a particular section.

The geo-fence may refer to a positioning-based technology that detects entrance/exist of the electronic device with respect to a region partitioned by a virtual boundary beyond notifying of the user's current location.

For example, the geo-fencing may be an interface using a Global Positioning System (GPS) which is one of location tracking technologies. That is, when a virtual fence called the geo-fence is designated through the GPS, geo-fencing serves to inform of an in/out event if the user (electronic device) enters or escapes from a geo-fence region.

The electronic device may identify entry into or exit from the geo-fence through a geo-fencing technology. As the number of geo-fences registered in the electronic device increases, the electronic device may reach a limit in applying the geo-fencing technology. For example, when the number of geo-fences to be processed by the electronic device is larger than the number (reference number) of geo-fences which can be supported by the memory and hardware (H/W) resources of the electronic device, the geo-fencing technology may be applied to the limited number of geo-fences based on an order of distance to each geo-fence. In this case, the electronic device may have a limit in monitoring the approach to the geo-fences. That is, since the electronic device continuously monitors the geo-fence based on the current location of the electronic device, the electronic device may not detect an approach of the electronic device to another geo-fence spaced far from the electronic device.

Accordingly, when a plurality of geo-fences exist, the electronic device may group and manage the geo-fences in order to reduce power consumption of a processor or efficiently use hardware resources.

According to various embodiments of the present disclosure, when the electronic device should monitor a plurality of geo-fences, the electronic device may avoid monitoring geo-fences in an unnecessary region among a geo-fence list and selectively monitor geo-fences which should be necessarily monitored.

Figure 4:
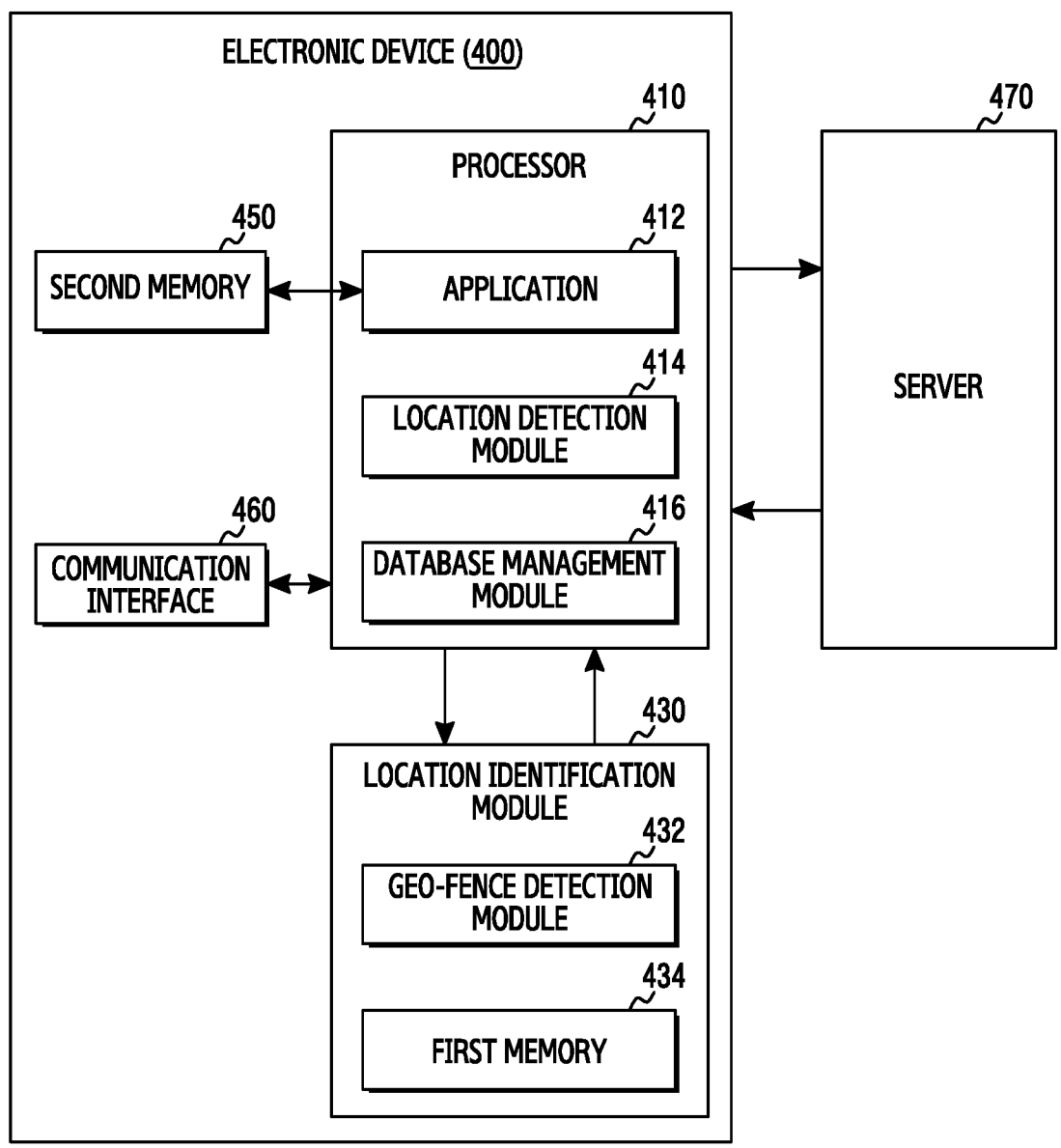
FIG. 4 is a block diagram illustrating an electronic device and a server that manage a geo-fence according to one embodiment of the present disclosure.

FIG. 4 is a block diagram illustrating an electronic device 400 and a server 470 that manage a geo-fence according to one embodiment of the present disclosure.

Referring to FIG. 4, the electronic device 400 (for example, the electronic device 101 of FIG. 1 or the electronic device 201 of FIG. 2) may include a processor 410, a location identification module 430, a second memory 450, and a communication interface 460.

The processor 410 (for example, the processor 120 of FIG. 1) may include one or more of a Central Processing Unit (CPU), an Application Processor (AP), and a Communication Processor (CP).

The processor 410 may include, for example, an application 412, at least one location detection module 414, and a database management module 416.

The application 412 may be stored in a second memory 450, a server 470, or some other location and loaded and processed by the processor 410. The application 412 may be, for example, an application related to the geo-fence.

The application 412 related to the geo-fence may include location information (for example, latitude and longitude) of a corresponding place (for example, a geo-fence of a Point Of Interest (POI)). Further, the place (location) which the application 412 detects may vary depending on the purpose of the corresponding application.

According to an embodiment, the application 412 may transfer a geo-fence list to the location detection module 414. The geo-fence list may be a geo-fence list downloaded from an external server 470 through the communication interface 460 by a request of the application 412 or stored in a second memory 450.

According to an embodiment, the application 412 may receive an in/out event of the electronic device 400 with respect to a particular place according to particular latitude/longitude of the particular place (location) from the location detection module 414 and notify the user of the in/out event. For example, the application 412 may transfer the geo-fence list including latitude/longitude of each place to the location detection module 414. The location detection module 414 may detect an in/out event of the electronic device 400 with respect to a particular place included in the geo-fence list by using the location identification module 430 and notify of the corresponding in/out event to the application 412. The application 412 in turn then notifies the user.

According to an embodiment, the location detection module 414 may store the geo-fence list (for example, location and latitude/longitude information of a place related to the geo-fence) received from the application 412 in the server 470, the second memory 450, or some other location. Further, the location detection module 414 may identify a current location of the electronic device 400 by using an acceleration sensor and the location identification module 430 (GPS, Wi-Fi, modem, BLE, or NFC) and detect whether an in/out event of the electronic device 400 with respect to a particular place is generated. Further, the location detection module 414 may transfer information on the generation of the in/out event to the application 412.

According to an embodiment, the location detection module 414 may store information on the geo-fence list received from the application 412 in the second memory 450, the server 470, or some other location and cluster or group the geo-fences according to the current location of the electronic device 400.

Further, the location detection module 414 may make a request for clustering or grouping the geo-fences to the database management module 416 by using the geo-fence list received from the application 412. The location detection module 414 may store the geo-fences clustered or grouped by the database management module 416 in the second memory 450, the server 470, or some other location. The location detection module 414 may register the grouped (clustered) geo-fences in the first memory 434 of the location identification module 430 to allow a geo-fence detection module 432 to detect an in/out event with respect to the geo-fence.

The database management module 416 may group the geo-fences based on, for example, a distance according to latitude/longitude of each geo-fence or some other criteria. For example, the location detection module 414 may make a request for grouping the geo-fence list received from the application 412 to the database management module 416. The database management module 416 may group the geo-fence list according to a particular criteria (for example, based on latitude/longitude, distance, or situation) by a request of the location detection module 414 and store the grouped geo-fence list in the second memory 450, the server 470, or some other location.

The server 470 may serve to store the application 412 related to the geo-fence or store the geo-fence list. Alternatively, the location detection module 414 may serve to receive location information of the geo-fence list (for example, latitude/longitude of the geo-fence) from the application 412 and store the location information of the geo-fence list. Alternatively, when the electronic device 400 starts monitoring the location of the electronic device 400 or during the monitoring, the location detection module 414 may make a request for corresponding geo-fence list information to the server 470 when the location of the electronic device 400 changes and thus more geo-fence location information is required.

The location identification module 430 may include, for example, the geo-fence detection module 432 and the first memory 434. The location identification module 430 may be implemented in hardware. For example, the location identification module 430 may detect the location of the electronic device 400 by using at least one of the location services such as GPS, Wi-Fi, and Cell.

The location identification module 430 may be a module that constructs the geo-fence and detects the geo-fence. For example, the processor 410 may register the geo-fence in the first memory 434 of the location identification module 430, and the geo-fence detection module 432 may detect an in/out event with respect to the geo-fence registered in the first memory 434. That is, the geo-fence detection module 432 may detect a moving state of the electronic device from an outside to an inside of a region corresponding to the geo-fence or a moving state from the inside to the outside of the region corresponding to the geo-fence, i.e. when the electronic device crosses a boundary of the geo-fence.

According to an embodiment of the present disclosure, the processor 410 may register geo-fences grouped based on a particular criteria in the first memory 434 of the location identification module 430, and the geo-fence detection module 432 may detect an in/out event with reference to the grouped and registered geo-fence.

For example, the application 412 related to the geo-fence may load the geo-fence list from the second memory 450 or the server 470. The location detection module 414 may receive location information (for example, latitude/longitude or distance) of the geo-fence list from the application 412 and process the received geo-fence list, or make a request for the location information of the geo-fence list to the database management module 416 and group the geo-fence list to be suitable for hardware resources (for example, the first memory 434) of the location identification module 430. The location detection module 414 may register the grouped geo-fence list in the first memory 434 of the location identification module 430, and the geo-fence detection module 432 may compare the registered geo-fence and a current location of the electronic device 400 to detect an in/out event of the geo-fence. When the geo-fence detection module 432 detects the in/out event with respect to the registered geo-fence, the geo-fence detection module 432 may wake up the location detection module 414 and the location detection module 414 may notify the application 412 of the generation of the in/out event.

In FIG. 4, the location identification module 430 may be a processor configured to monitor a geo-fence group, and the processor 410 may be another processor functionally connected to the location identification module 430. Then the processor 410 may transmit a geo-fence group including at least some of a plurality of geo-fences to the location identification module 430, and the electronic device 400 may receive a notification corresponding to a movement from an outside to an inside of one geo-fence included in the geo-fence group or a movement from the inside to the outside of the one geo-fence from the location identification module 430.

At this time, the processor 410 may update the geo-fence group in response to the movement of the electronic device 400 (movement from the outside to the inside or the movement from the inside to the outside). Further, when geo-fence groups are generated, the processor 410 may generate the geo-fence groups based on the limited number, generate the geo-fence groups based on a user's behavior pattern, or generate the geo-fence groups based on location information corresponding to a plurality of geo-fences. Further, the location identification module 430 may consume power lower than that of the processor 410.

The server 470 may store location information corresponding to the plurality of geo-fences. The processor 410 may classify the plurality of geo-fences into a plurality of main groups based on distance or latitude and longitude coordinates of the geo-fences, or based on the current location of the electronic device 400. The location identification module 430 may monitor whether the electronic device 400 approaches regions corresponding to the plurality of main groups. When the electronic device 400 approaches within a region corresponding to one of the plurality of main groups, the location identification module 430 may inform the processor 410 of the approach. Then, the processor 410 may classify one main group into a plurality of sub-groups. The location identification module 430 may monitor sub-groups.

The processor 410 may determine first candidates amongst the various geo-fences to be monitored among the plurality of geo-fences based on location information and generate a virtual geo-fence including a location corresponding to the electronic device 400 and the first candidates. The location identification module 430 may monitor the virtual geo-fence. At this time, when the electronic device exits the virtual geo-fence, the location identification module 430 may detect this and notify the processor 410. Then, the processor 410 may determine second candidates to be monitored among the plurality of geo-fences based on the location of the electronic device 400.

According to various embodiments of the present disclosure, the electronic device may include a first processor configured to monitor a geo-fence group and a second processor functionally connected to the first processor, and the second processor may be configured to transmit the geo-fence group including at least some of a plurality of geo-fences to the first processor and receive, from the first processor, a notification that the electronic device moves from an outside to an inside of one geo-fence of the geo-fence group or from the inside to the outside of the one geo-fence. The second processor may monitor the first geo-fence group and/or at least one geo-fence included in in the first geo-fence group when the electronic device is located in one of the one or more geo-fence groups (first geo-fence group), and may re-group the plurality of geo-fences as one or more geo-fence groups when the electronic device escapes from the first geo-fence group.

According to an embodiment, the second processor may acquire a current location of the electronic device, calculate a distance between the current location and each geo-fence, and, based on the calculated distance and/or a number of geo-fences which can be monitored, re-group at least one geo-fence which meets the number of geo-fences which can be monitored in a nearest order from the current location as one geo-fence group. The second processor may calculate a distance from the electronic device to a point where the electronic device comes to escape from a geo-fence range when the electronic device is located inside the geo-fence range and calculate a distance from the electronic device to a point where the electronic device comes to enter the geo-fence range when the electronic device is located outside the geo-fence range, and then arrange the calculated geo-fences in a nearest order from a current location of the electronic device and configure a predetermined number of geo-fences as a geo-fence group.

According to an embodiment, the second processor may classify the plurality of geo-fences into a plurality of higher geo-fence groups based on location information of latitude and longitude and, when it is identified that the electronic device approaches within a region corresponding to one of the plurality of higher geo-fence groups based on a monitoring result of the first processor, classify the one higher geo-fence group into a plurality of lower geo-fence groups. The first processor may monitor the plurality of lower geo-fence groups. The first processor may consume lower power in comparison with the second processor.

According to an embodiment, the second processor may generate the geo-fence group to include a limited number of geo-fences. The second processor may form a first geo-fence group based on a behavior pattern of a user and then form a second geo-fence group with the remaining geo-fences among the limited number of geo-fences based on location information. The location information may be latitude and longitude of the electronic device or distances between the electronic device and geo-fences.

According to one embodiment of the present disclosure, when the electronic device monitors a plurality of geo-fences, a geo-fence list may be clustered or grouped based on a particular reference and then monitored.

For example, when the electronic device should monitor a plurality of geo-fences, not all the geo-fences to be monitored can be registered in some cases due to current consumption and a limit of hardware resources. In this case, the electronic device may be required to monitor the geo-fence list after clustering or grouping based on a particular reference.

FIGS. 5A to 5D illustrate configurations of grouping geo-fences according to various embodiments of the present disclosure.

Figure 5A:
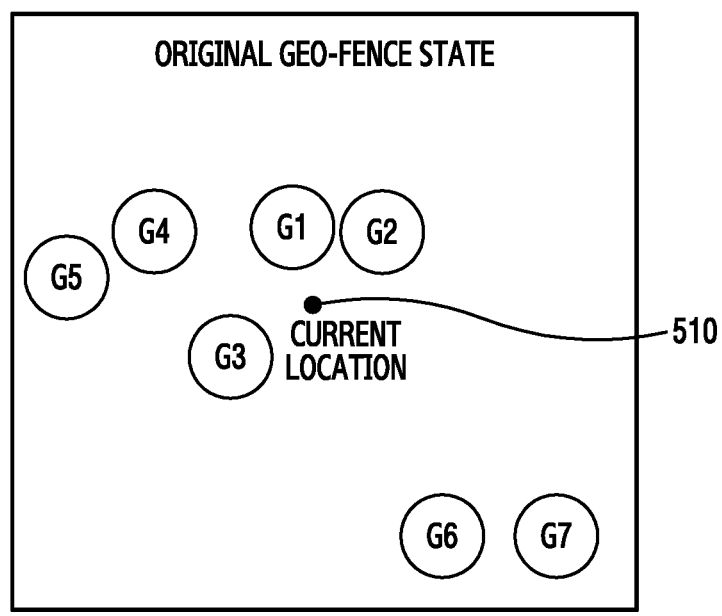
FIG. 5A, FIG. 5B, FIG. 5C and FIG. 5D illustrate configurations of grouping geo-fences according to one embodiment of the present disclosure.

FIG. 5A is a diagram before geo-fences are clustered or grouped. Referring to FIG. 5A, a point 510 may indicate a current location of the electronic device 400, and circular virtual geographic fences G1 to G7 may indicate gen-fences.

The location identification module 430 may predefine the number of geo-fences which can be allowed by the electronic device 400 based on size of the first memory 434 or available hardware resources. For example, when it is assumed that the number of available geo-fences of the location identification module 430 is 5 among a total of 7 geo-fences of FIG. 5A, the geo-fence detection module 432 may register only 5 geo-fences and monitor only the 5 registered geo-fences. The two remaining geo-fences may not be monitored by the location identification module 430.

The electronic device 400 may require a method of reducing power consumption and efficiently monitor the geo-fences. To accomplish that goal, the electronic device 400 may cluster or group all the geo-fences and monitor only the clustered or grouped geo-fences. For example, FIG. 5A considers a method by which the electronic device 400 divide the geo-fences into two groups and registers the two groups, wherein one group includes four geo-fences and the other one group includes three geo-fences, instead of a scenario where the electronic device 400 registers and monitors all the seven geo-fences. When the current location of the electronic device 400 is beyond areas of the two groups, the electronic device 400 may register the two groups in a geo-fence list. When the electronic device 400 moves within the region of one of the two groups, the electronic device 400 may register the group containing the electronic device 400 and monitor the geo-fences in the corresponding group.

According to an embodiment of the present disclosure, the electronic device may cluster or group a plurality of geo-fences based on latitude/longitude.

Figure 5B:
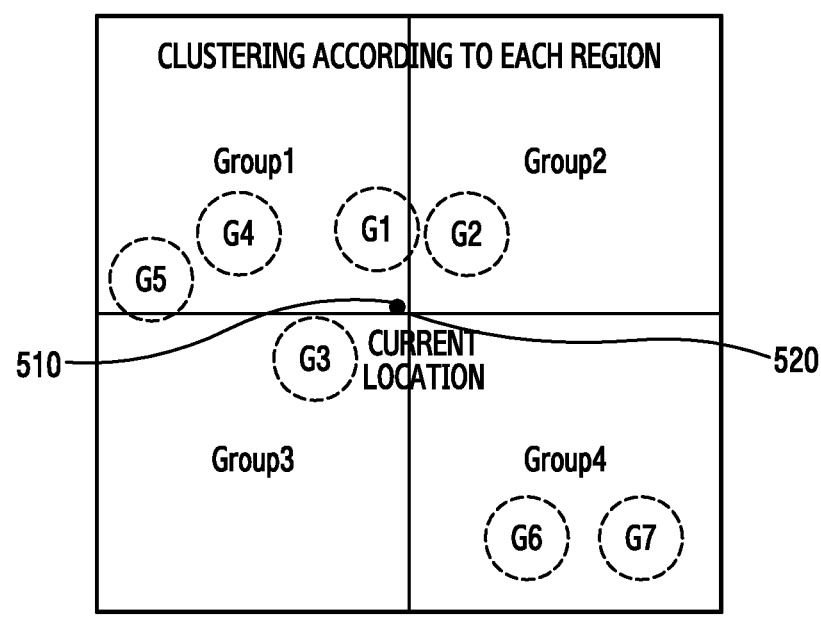

FIG. 5B illustrates an example before the geo-fences are grouped according to each region based on latitude/longitude information.

The electronic device 400 may acquire a geo-fence list including at least one geo-fence within a preset distance based on the current location of the electronic device 400 from the second memory 450 or the server 470. Referring to FIG. 5B, the electronic device 400 may calculate a center 520 based on an average value of latitude/longitude of each of at least one geo-fence included in the geo-fence list and identify included geo-fences at a regular interval of latitude/longitude (for example, 1 degree) from the center 520. The electronic device 400 may compare the number of geo-fences (for example, the number of geo-fence group) within the regular interval of latitude/longitude and the number allowed by hardware resources, and when the number of geo-fences within the regular interval of latitude/longitude is larger than the number allowed by hardware resources, the electronic device 400 may group the geo-fences based on an interval of latitude/longitude (for example, 0.5 degrees) smaller than the first interval. That is, the electronic device 400 may repeatedly group the geo-fences according to each region based on latitude/longitude until the number of geo-fences (geo-fences and geo-fence groups) to be registered is suitable for the number of allowed hardware resources.

For example, the electronic device 400 may form sub-groups based on a unit (for example, 0.5 degrees) smaller than the first interval (for example, 1 degree) or form sub-groups by rounding off the latitude/longitude to zero decimal places.

According to an embodiment of the present disclosure, the electronic device may cluster or group a plurality of geo-fences based on distance information of the electronic device.

Figure 5C:
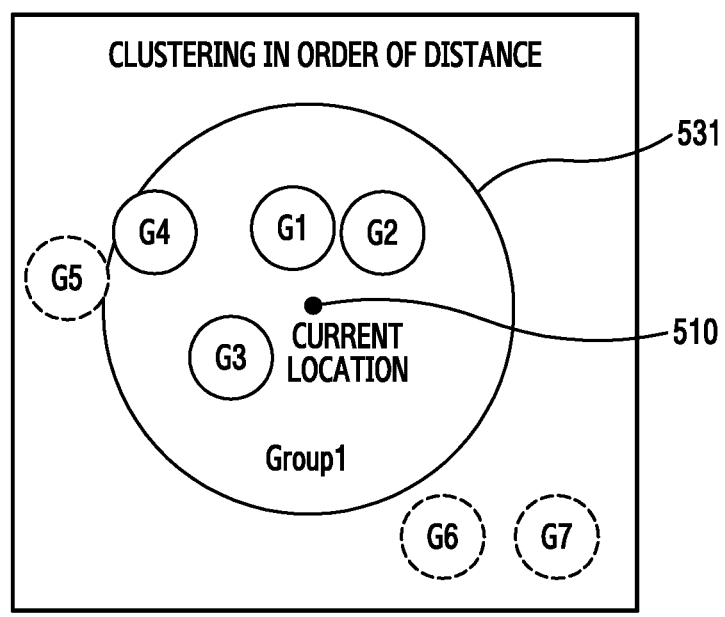

FIG. 5C illustrates an example before the geo-fences are grouped based on distance information.

Referring to FIG. 5C, when it is assumed that the number of geo-fences which can be allowed on hardware resources of the location identification module 430 or the number of allowed geo-fences input by the user is five, the electronic device 400 may identify geo-fences up to 4 geo-fences closest to the current location of the electronic device 400.

For example, the electronic device 400 may register geo-fences G1, G2, G3, and G4 closest to the current location of the electronic device 510 in group 531 in the location identification module 430 and monitor a total of four geo-fences. The virtual group 531 may be referred to as a virtual fence.

According to an embodiment, the electronic device 400 may calculate a distance from the electronic device 400 to a point where the electronic device 400 exits a geo-fence when the electronic device 400 is located inside the geo-fence. The device can also calculate a distance from the electronic device 400 to a point where the electronic device 400 enters a geo-fence when the electronic device 400 is located outside the geo-fence.

When the electronic device 400 moves within group #1 531, new grouping is not performed. However, when the electronic device 400 moves beyond group 531, new grouping may be performed based on the distance between a changed current location of the electronic device (outside the region of group #1 531) and each geo-fence.

According to an embodiment of the present disclosure, the electronic device may cluster or group a plurality of geo-fences based on a recognition scheme.

Figure 5D:
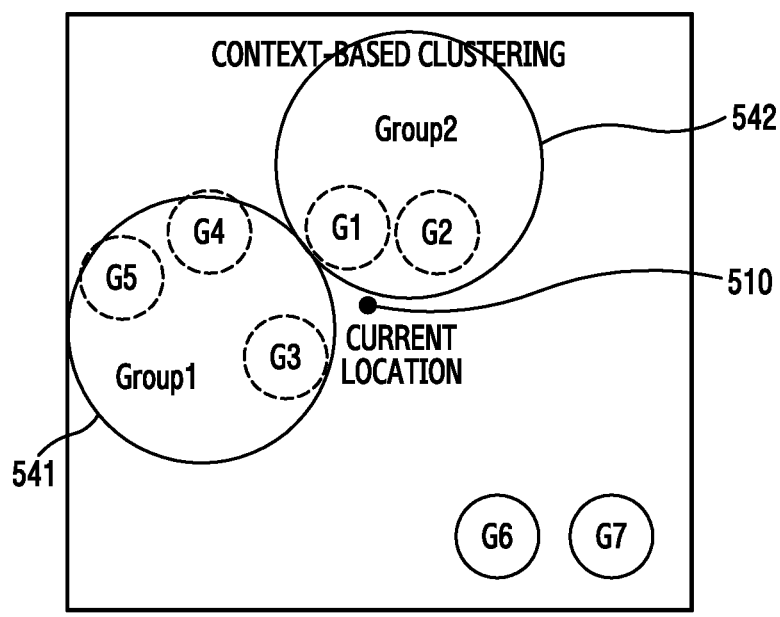

FIG. 5D illustrates an example of grouping geo-fences based on context-aware scheme. That is, the electronic device 400 may independently register frequently visited geo-fences without grouping the geo-fences, or group, register, and monitor only the frequently visited geo-fences.

Referring to FIG. 5D, it is assumed that the geo-fences G6 and G7 are places (for example, home or office) which the user (for example, the electronic device 400) frequently visits. The place which the user frequency visits refers to a place to/from which the user frequency moves, so that an in/out event may be frequently generated therein. Accordingly, when the electronic device 400 groups the geo-fences G6 and G7, which are the frequency visited places, with another geo-fence, the processor 410 may frequently receive a notification request and thus power consumption may increase.

According to an embodiment, the electronic device 400 may independently register the geo-fences G6 and G7 in the location identification module 430 without grouping the frequently visited geo-fences G6 and G7 with other geo-fences based on the context-aware scheme, and groups, register, and monitor the remaining geo-fences G1 to G5 as group #1 541 and group #2 542 based on latitude/longitude or distances thereof.

Further, the electronic device 400 may group and monitor only the frequently visited geo-fences G6 and G7 as one group without grouping the geo-fences G6 and G7 with other geo-fences.

According to various embodiments of the present disclosure, a plurality of geo-fences may be grouped according to a similarity between latitude/longitude of the geo-fences included in the geo-fence list.

Referring to FIGS. 4 and 5B, in a process of grouping at least one geo-fence, the application 412 may make a request for monitoring an in/out event with respect to at least one geo-fence included in the geo-fence list to the location detection module 414. The application 412 may desire to receive only one event between the in and out events of the electronic device 400 with respect to the geo-fence, and may temporarily stop or re-initiate the monitoring by a user's request.

The location detection module 414 may store received information on the geo-fence list (for example, distance or latitude/longitude) in the second memory 450 or the server 470, and make a request for clustering or grouping the geo-fence list to the database management module 416 according to the current location of the electronic device 400. The database management module 416 may group the geo-fences based on a particular criteria (for example, latitude/longitude, an order of distance, or context-aware).

According to an embodiment, the electronic device 400 may form a group according to locations (for example, latitude/longitude) of the geo-fences in the geo-fence list. The electronic device 400 may identify latitude/longitude of each geo-fence in the geo-fence list, identify geo-fences within a regular interval of latitude/longitude by comparing the latitude/longitude of each geo-fence with the current location of the electronic device 400, and group the identified geo-fences according to the latitude/longitude.

For example, the electronic device 400 may detect the current location of the electronic device 400 and identify the number of included geo-fences at an interval of 1 degree of the latitude/longitude from the current location of the electronic device 400. Alternatively, the electronic device 400 may identify the number of geo-fences within a predetermined distance (for example, about 100 km) corresponding to a regular interval (for example, 1 degree) from the current location of the electronic device 400. The electronic device 400 may compare the number of geo-fences and the number of hardware resources or geo-fences which are allowed by the user and, when grouping is required, group the geo-fences according to the latitude/longitude similarity.

The electronic device 400 may form a large group (higher group) whose boundary is a predetermined distance (for example, 100 km) from the current location of the electronic device 400 and identify whether the number of geo-fences within the corresponding group has a size which can be sufficiently handled with by the hardware resources of the location identification module 430. When the number of geo-fences within the corresponding group has the size which can be sufficiently handled with by the location identification module 430, the electronic device 400 may start the monitoring of the corresponding group. Otherwise, the electronic device 400 may divide the group in the smaller unit to form the lower groups as described above.

For example, when the limited number of geo-fences, which can be registered, is N due to the first memory 434 of the location identification module 430 and the number of geo-fences of the corresponding group is larger than N, the electronic device 400 may divide the group in the unit of lower groups and form the lower groups.

Figure 6A:
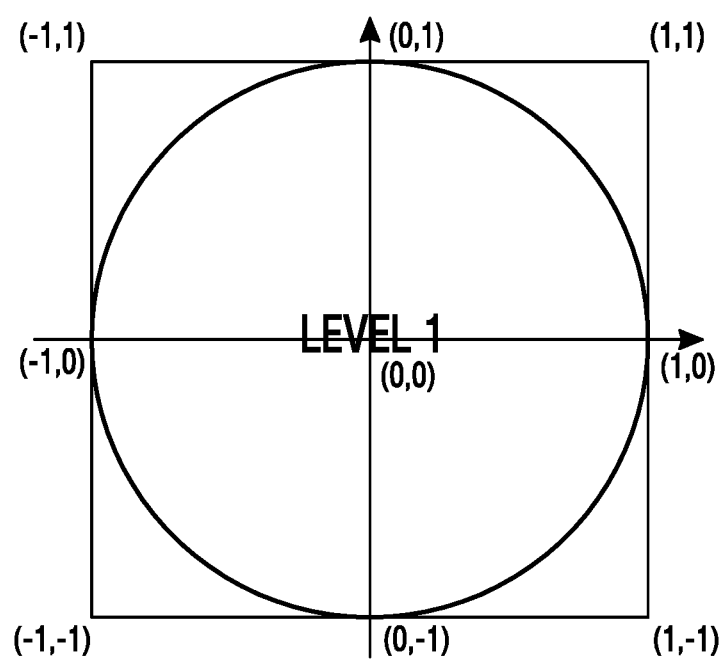
FIG. 6A and FIG. 6B illustrate configurations of geo-fence list levels according to one embodiment of the present disclosure.
Figure 6B:
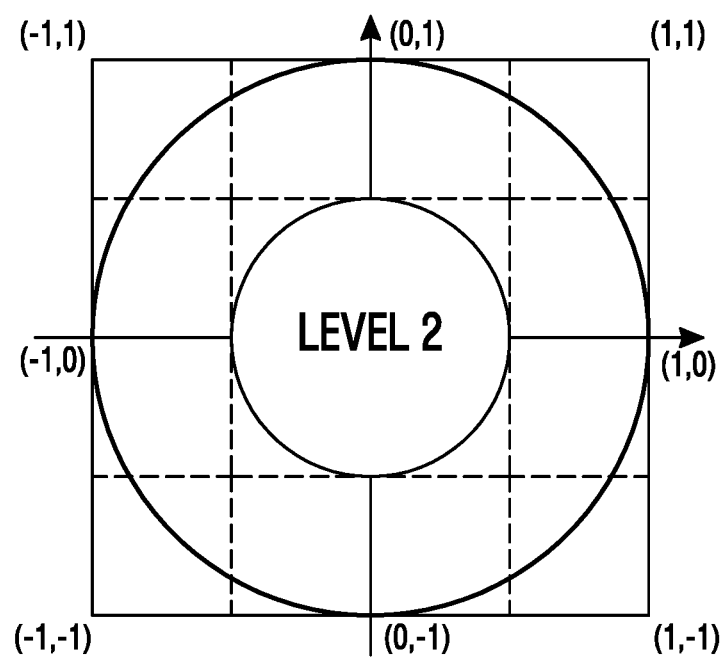

FIGS. 6A and 6B illustrate configurations of geo-fence list levels according to various embodiments of the present disclosure. FIG. 6A illustrates forming geo-fence list level 1 which corresponds to a larger group with a 1 degree difference of latitude/longitude or 100 kms from the location of the electronic device, and FIG. 6B illustrates forming geo-fence list level 2 which corresponds to a sub-group of geo-fence list level 1.

Referring to FIGS. 4 and 6A, before starting monitoring the geo-fence, the location detection module 414 may load information on all geo-fences which are not beyond a predetermined distance (for example, about 100 km) from the current location of the electronic device 400 from the server 740 or the second memory 450. This may be the foundation for making a large group into a large group that covers about 100 km.

Referring to FIG. 6A, when a value generated by subtracting the latitude/longitude value of the current electronic device 400 from a latitude/longitude value of each geo-fence is larger than or equal to −1.0 and smaller than 1.0, the electronic device 400 may determine that each geo-fence is close to a location smaller than the predetermine distance (for example, 100 km) from the center. The center may be an average value of latitude/longitude of the geo-fences. The distance difference of about 100 km may be based on an assumption that the latitude/longitude difference of 1 degree corresponds to the distance difference of about 100 km. An actual distance for the difference of 1 degree vary depending on latitude/longitude, and it may be solved through the following method of determining a radius of a higher level (lower group) covering a lower level (higher group).

For example, the electronic device 400 may determine all geo-fences, which are located within the latitude/longitude difference of about 1 degree from the center, that is, within 100 km from the center as geo-fence list level 1 (for example, the larger group).

Referring to FIG. 6B, in a state where the electronic device 400 has geo-fence list level 1, the location detection module 414 of the electronic device 400 may detect an available range N of worst resources among available hardware resources. Alternatively, the location detection module 414 may determine N as the number of geo-fences which can be allowed by the user. When geo-fence list level 1 is larger than N, the electronic device 400 may form new sub-group geo-fence list level 2.

For example, to discard values smaller than one degree, the electronic device 400 may refer to values obtained by rounding off latitudes/longitudes of geo-fences at the first digit after the decimal point, so as to form a lower group including geo-fences having the same value. At this time, a lower group list may be defined as geo-fence list level 2. Referring to FIG. 6B, it is noted that the number of geo-fence groups of level 2 is nine.

Basically, a total of 10 geo-fence lists including the geo-fences within the radium of about 100 km, which is the reference of level 1, and a maximum of 9 groups, which can be generated as level 2, may be formed.

Figure 7:
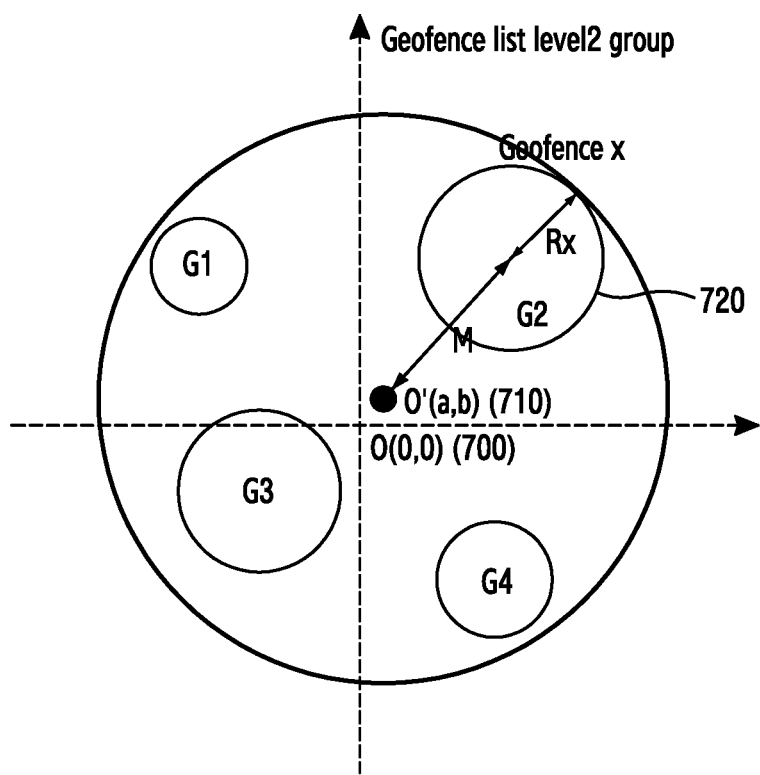
FIG. 7 illustrates a method of identifying a radius of a lower group of the geo-fence according to one embodiment of the present disclosure.

FIG. 7 illustrates a method of identifying a radius of a sub-group of the geo-fence according to various embodiments of the present disclosure.

A radius of a range of geo-fence list level 2 may be set based on a geo-fence having a farthest detection region among the geo-fences within geo-fence list level 2 from latitude/longitude of the corresponding center.

Referring to FIG. 7, since the boundary of geo-fence X 720 is the farthest from center O' 710 of the group at level 2, the radius of the geo-fence list level 2, as shown in FIG. 7, as M (the distance between O' and the center of geo-fence X 720) plus Rx (the radius of geo-fence X 720). For example, when latitude/longitude of the geo-fence X 720 within the corresponding group is (x, y) and latitude/longitude of the reference of the group at level 2 is O' (a, b) 710, the electronic device 400 may calculate a distance M from (a, b) to (x, y) and a radius Rx of the geo-fence X with (x, y) as the center. That is, M+Rx becomes a maximum value of the group at level 2, so that M+Rs may be the radius of geo-fence list level 2.

When only one geo-fence exists in the geo-fence list, the center and the radius of the corresponding group may be the same as those of the sub-group. At this time, an unnecessary overlapping geo-fence group may be created due to the grouping, so that the corresponding geo-fence may be included in a closest group or, when only group is formed besides the corresponding group, the corresponding geo-fence itself may be considered as the group (geo-fence list), thereby avoiding overlapping monitoring.

In the similar way, based on a farthest range of the geo-fences of level 1, the radius of level 1 may be flexible rather than fixed to 100 km. In this way, a sub-group of a sub-group may be generated.

According to one embodiment, the electronic device 400 may reduce load of the hardware resources by geo-fencing a geo-fence group of a lower level (higher group) including a current location of the electronic device 400 and geo-fences corresponding to group members included in the corresponding group.

According to one embodiment, the electronic device 400 may reduce load of the hardware resources by only monitoring the geo-fences in a particular group of geo-fences.

Although it is disclosed that the geo-fences may be grouped according to N, the maximum number of geo-fences that can be registered in the electronic device, it may be preferable that the geo-fences are grouped according to a number smaller than N. This is because overlapping monitoring may be performed through grouping of each geo-fence When the electronic device 400 ends a grouping process for monitoring the location, the location identification module 430 may start hardware geo-fencing by using lists of level 1, which is configured as the largest group, and level 2. For example, when the electronic device 400 recognizes that the electronic device 400 enters the corresponding region(geo-fence), the electronic device 400 may compare the geo-fence with a lower list (original geo-fence) of the corresponding region and then, when there is no lower geo-fence that is detected in (entered) the lower list, reduce the level and perform re-registration. That is, the electronic device 400 may register a geo-fence of level 2, the region of which the electronic device 400 has entered, and a sub-group of the geo-fence of level 2. In this case, the electronic device 400 may perform a grouping again and register a geo-fence list of level 3. Similarly, the level or group may be divided based on N−3.

According to one embodiment of the present disclosure, the location detection module 414 may learn overlapping or duplicated geo-fences while detecting the location. In a state where it is detected that the electronic device 400 has entered geo-fence A, when it is detected that the electronic device 400 has entered geo-fence B, it may be recognized that the two geo-fences overlap each other.

According to various embodiments of the present disclosure, the location detection module 414 may remember visit frequencies of each group and geo-fence regions while detecting the location. Based on the visit frequency, the group for frequently visited geo-fences may be newly defined based on context-aware.

Figure 8A:
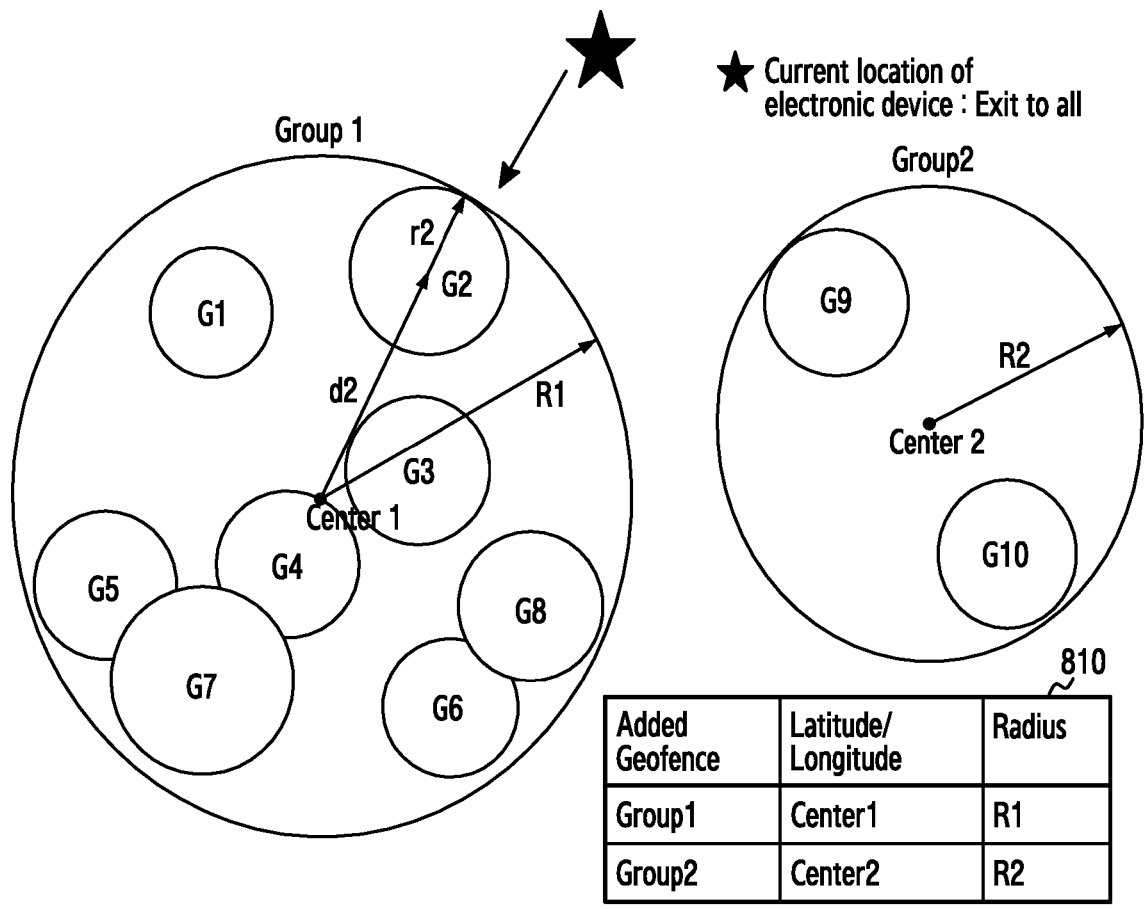
FIG. 8A, FIG. 8B and FIG. 8C illustrate registration of the geo-fence according to one embodiment of the present disclosure.
Figure 8B:
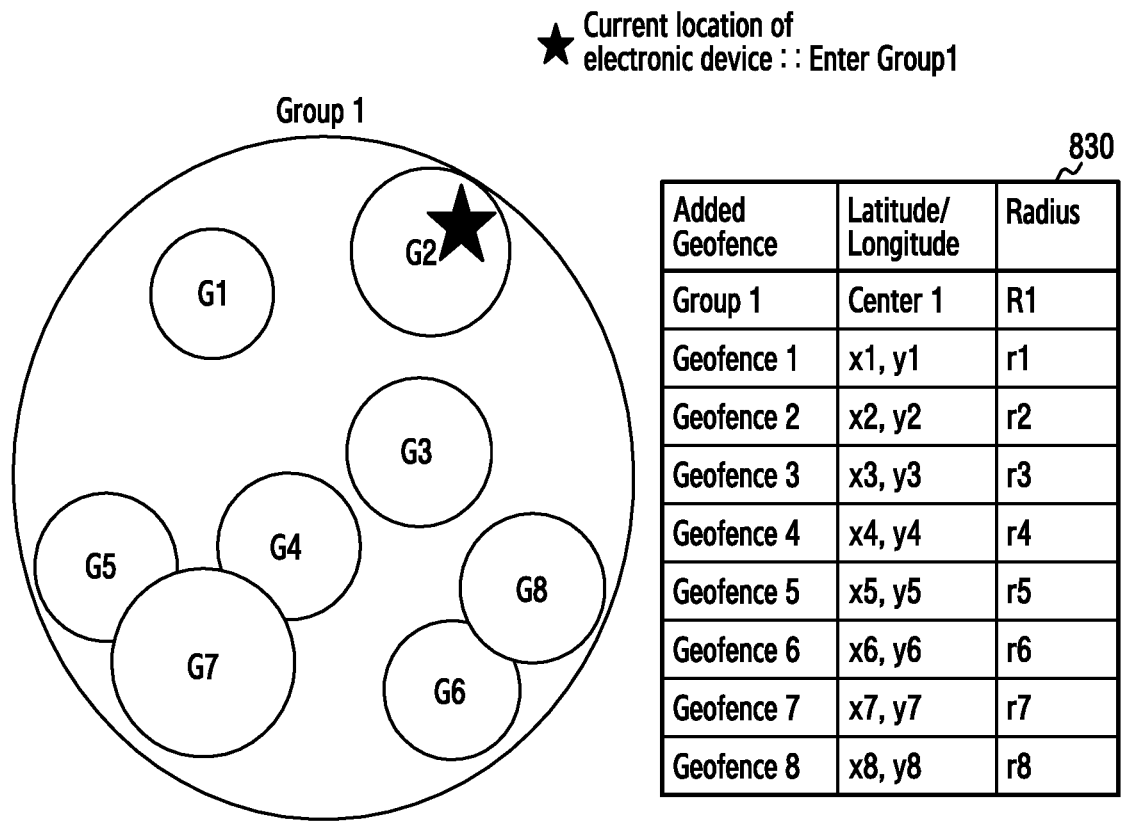
Figure 8C:
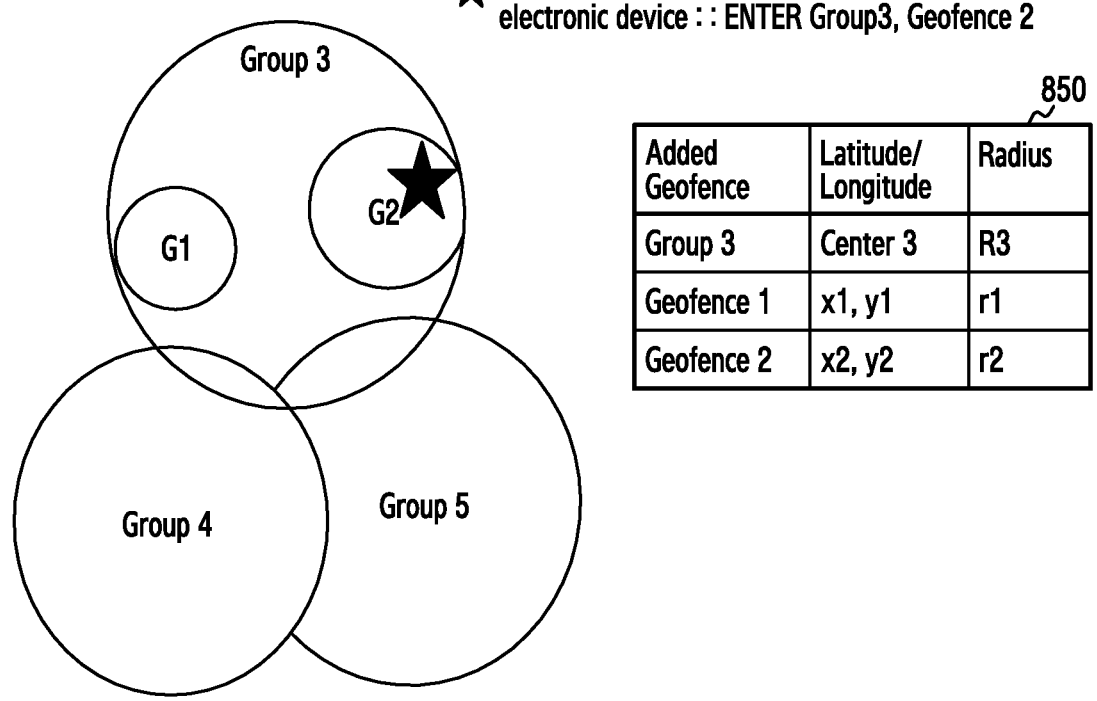

FIGS. 8A to 8C illustrate registration of the geo-fence according to various embodiments of the present disclosure. Referring to FIGS. 8A to 8C, it is assumed that the user moves inside a region of group 1 from the outside of regions of all groups.

Referring to FIG. 8A, G1 to G10 may refer to geo-fences. For example, a total of 10 geo-fences may exist in the corresponding region, and geo-fences of group 1 may be G1 to G8 and geo-fences of group 2 may be G9 and G10. Further, it may be assumed that hardware resources of the electronic device may register a maximum of 6 geo-fences.

Referring to a table 810 of FIG. 8A, the location identification module 430 of the electronic device 400 may register a geo-fence list including group 1 and group 2. Referring to FIG. 8A, it may be assumed that the electronic device 400 moves to group 1 from a state where the electronic device 400 does not enter any group.

In this case, the location identification module 430 may register and monitor latitude/longitude of center 1, which is the center of group 1, and latitude/longitude of center 2, which is the center of group 2, without monitoring the geo-fences G1 to G8.

Center 1, which is the center of group 1, may be determined by an average value of latitude/longitude values of the geo-fences G1 to G8. A radius R1 of group 1 may be determined by a value (R1=d2+r2) generated by adding a distance d2 between center 1 and the center of the geo-fence G having a farthest detection region and a radius r2 of the geo-fence G2.

Similarly, center 2, which is the center of group 2, may be determined by an average value of latitude/longitude values of the geo-fences G9 and G10. A radius R2 of group 2 may be determined by a value generated by adding a distance between center 2 and a geo-fence (for example, G9) having a farther detection area and a radius of the geo-fence (for example, G9). In this case, the location identification module 430 of the electronic device 400 only has to monitor two geo-fences configured as group 1 and group 2, and thus the hardware resources may be sufficient.

Referring to FIG. 8B, the user (for example, the electronic device 400) may enter the radius R1 of group 1. When the electronic device 400 enters group 1, the location detection module 414 of the electronic device 400 may delete group 2 registered in the location identification module 430 and additionally register lower geo-fences of group 1.

For example, the location identification module 430 may register eight geo-fences of group 1 as well as group 1 as shown in a table 830 of FIG. 8B. In this case, the hardware resources of the location identification module 430 should allow 9 or more geo-fences.

As described above, when the number of geo-fences which are allowed by the hardware resources (for example, capacity of the first memory 434 included in the location identification module 430) is limited to 6, the location identification module 430 may additionally group the geo-fences inside group 1 and generate groups 3, 4, and 5 as illustrated in FIG. 8C. That is, groups 3, 4, and 5 may be the sub-groups of group 1.

When the user (for example, the electronic device 400) is not located in any region of groups 3, 4, and 5, the location identification module 430 may register groups 1, 3, 4, and 5 as geo-fences to be monitored. However, as illustrated in FIG. 8C, when the current location of the electronic device 400 is within the geo-fence G2 included in group 3, the location detection module 414 may inform the user of the application of an event corresponding to entry of the electronic device 400 into the geo-fence G2. Thereafter, for additionally monitoring the geo-fence, the location detection module 414 may register group 3 and the geo-fences G1 and G2 as the geo-fences to be monitored. The monitoring of group 3 by the location identification module 430 may be maintained until the location of the electronic device 400 exits from group 3. When the electronic device 400 moves to another sub-group (group 4 or 5), the location detection module 414 of the electronic device 400 may change a target to be monitored into the other sub-groups and geo-fences corresponding to the sub-groups. Further, when the electronic device 400 moves to a region of a larger group (group 1), the location detection module 414 may change a target to be monitored into group 1 and sub-groups 3, 4, and 5. The monitoring of group 1 and the included geo-fences may be maintained until the electronic device 400 exits from the region of group 1.

Figure 9A:
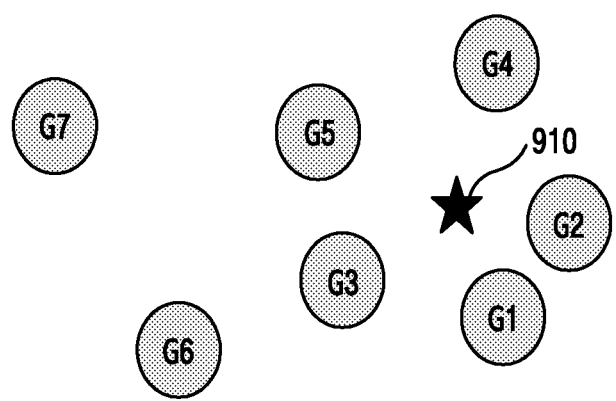
FIG. 9A, FIG. 9B and FIG. 9C illustrate a process in which the electronic device forms a geo-fence group according to one embodiment of the present disclosure.
Figure 9B:
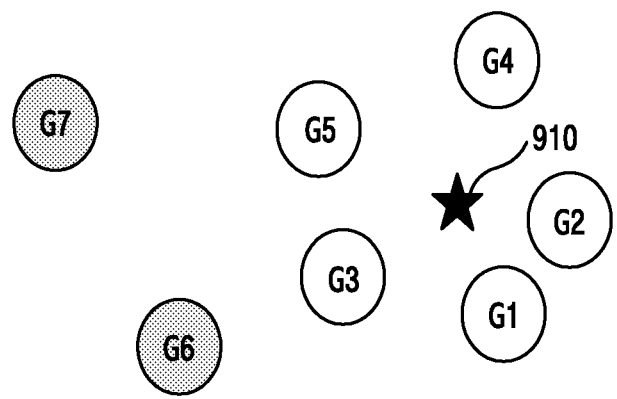
Figure 9C:
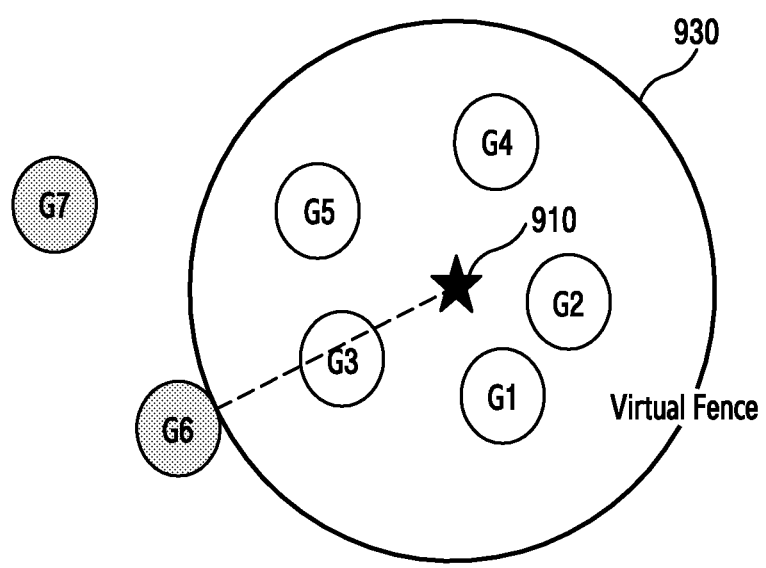

FIGS. 9A to 9C illustrate a process in which the electronic device forms a geo-fence group according to one embodiment of the present disclosure.

FIG. 9A illustrates the electronic device 400 and each geo-fence before a group is formed. The electronic device 400 may measure a distance to each geo-fence whenever measuring a current location of the electronic device 400. The electronic device 400 may arrange geo-fences up to N (for example, 6) geo-fences, where N is the limit of geo-fences to be monitored due to hardware resources.

Referring to FIG. 9A, circular shaped G1 to G7 may indicate geo-fences, and a star shape 910 may indicate a current location of the electronic device 400. The electronic device 400 may measure a distance from the current location 910 of the electronic device 400 to each geo-fence and list the geo-fences (for example, G1 to G7) sorted by distance. For example, the number marked on each geo-fence may indicate an order to the geo-fence which is closer to the current location 910 of the electronic device 400.

FIG. 9B illustrates a process in which the electronic device 400 registers N−1 geo-fences sorted by distance between the current location of the electronic device 400 and each geo-fence. After listing the geo-fences sorted by location closer to the current location 910 of the electronic device 400, the electronic device 400 may register the N−1 geo-fences sorted by distance. That is, when N is 6, the electronic device 400 may register 5 geo-fences (G1 to G5), which are close to the current location 910 of the electronic device 400, as illustrated in FIG. 9B.

FIG. 9C illustrates that the electronic device 400 forms a group in an order of distance between the current location and each geo-fence. Referring to FIG. 9C, the electronic device 400 may form a geo-fence group corresponding to a virtual geo-fence 930 with a radius of a distance from the current location of the electronic device 400 to a sixth geo-fence (G6). For example, in the geo-fence group, latitude/longitude may be determined with the current location of the electronic device 400 as the center and with the distance to an N$^{th}$ geo-fence as the radius.

The geo-fence group, which is the virtual geo-fence, may be referred to a virtual fence, and all geo-fences can be monitored in real time since the location identification module 430 provides a notification to the processor 410 at the moment when the electronic device 400 exits from the virtual fence 930. When the electronic device 400 moves and exits from the virtual fence 930, the electronic device 400 may form a new group again based on a new location of the electronic device 400 outside the virtual fence 930 and the distances between the new location and the existing geo-fences.

Even though the electronic device 400 moves through the method of forming the virtual fence 930 by distance, the distance to each geo-fence is newly measured, so that the method may be adaptively applied to a case where the geo-fence is added or deleted.

Figure 10:
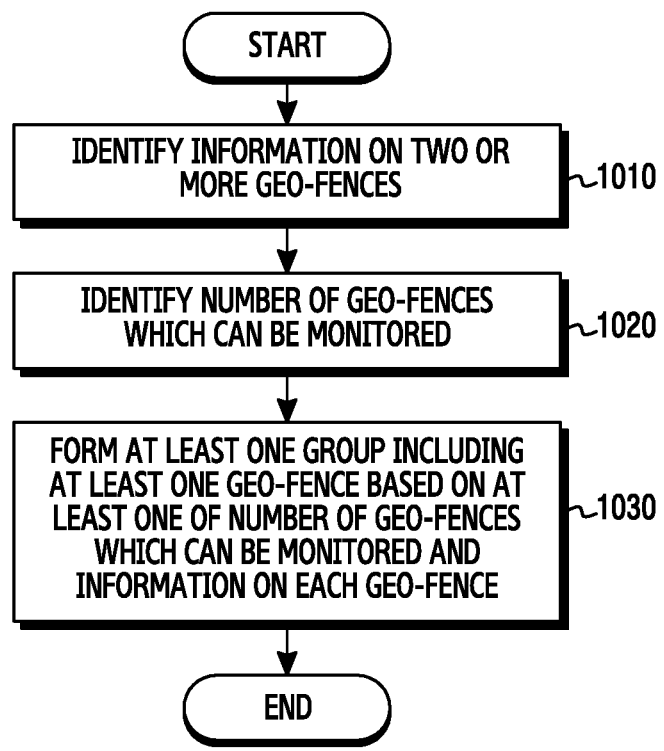
FIG. 10 is a flowchart illustrating a process for forming a higher group based on latitude/longitude of the geo-fence according to one embodiment of the present disclosure.

FIG. 10 is a flowchart illustrating a process for forming a higher group based on latitude/longitude of the geo-fence according to various embodiments of the present disclosure.

Referring to FIG. 10, in operation 1010, the electronic device 400 may identify information on two or more geo-fences. The information on the geo-fences may refer to latitude/longitude of a particular geo-fence location. For example, the database management module 416 of the electronic device 400 may identify latitude/longitude information of at least one geo-fence included in the geo-fence list received through the application 412.

In operation 1020, the electronic device 400 may identify the number of geo-fences which can be monitored (registered). The electronic device 400 may identify the number of geo-fences which can be monitored based on a state (for example, memory capacity) of the first memory 434 which is the hardware resources of the location identification module 430. The number of groups which can be formed by the electronic device 400 may be equal to or smaller than the number of geo-fences which can be monitored. For example, when the number of geo-fences which can be monitored is 6, the number of groups which can be formed by the electronic device 400 may be equal to or smaller than 6.

In operation 1030, the electronic device 400 may generate at least one group including at least one geo-fence based on at least one of the number of geo-fences which can be monitored and information on each geo-fence.

As described above, the number of geo-fences which can be monitored (for example, the number of geo-fences which can be registered in the electronic device 400) may be equal to or larger than number of groups which can be formed by the electronic device 400. One group may be recognized as a group of a plurality of geo-fences or one geo-fence.

For example, the electronic device 400 may identify latitude/longitude which is the information on each geo-fence in the geo-fence list in operation 1010, and may register the latitude/longitude in the location identification module 430 and identify the number of geo-fences which can be monitored in operation 1020. The electronic device 400 may identify the number of geo-fences within a predetermined latitude/longitude interval (for example, 1 degree) and compare the number of geo-fences within the same latitude/longitude interval with the number of geo-fences which can be monitored, so as to form one group including at least one geo-fence.

According to an embodiment, when the number of geo-fences which can be monitored is smaller than the number of geo-fences within the same latitude/longitude interval, the electronic device 400 may form several groups due to the limit on resources of the location identification module 430. For example, when the number of geo-fences which can be monitored is 10 and 100 geo-fences are included within a latitude/longitude interval of 1 degree, the electronic device 400 can only monitor some, not all, of the 100 geo-fences. Accordingly, the electronic device 400 may form and monitor several groups including at least one geo-fence.

According to an embodiment, when the number of geo-fences which can be monitored is larger than or equal to the number of geo-fences within the same latitude/longitude interval, the electronic device 400 may form several groups to properly distribute resources of the location identification module 430. For example, when the number of geo-fences which can be monitored is 10 and 10 geo-fences exist within the latitude/longitude interval of 1 degree, the electronic device 400 may register and monitor all the 10 geo-fences, but may group the 10 geo-fences into 2 or 3 groups and monitor the grouped geo-fences in terms of power consumption and the proper distribution of the resources of the location identification module 430.

Figure 11:
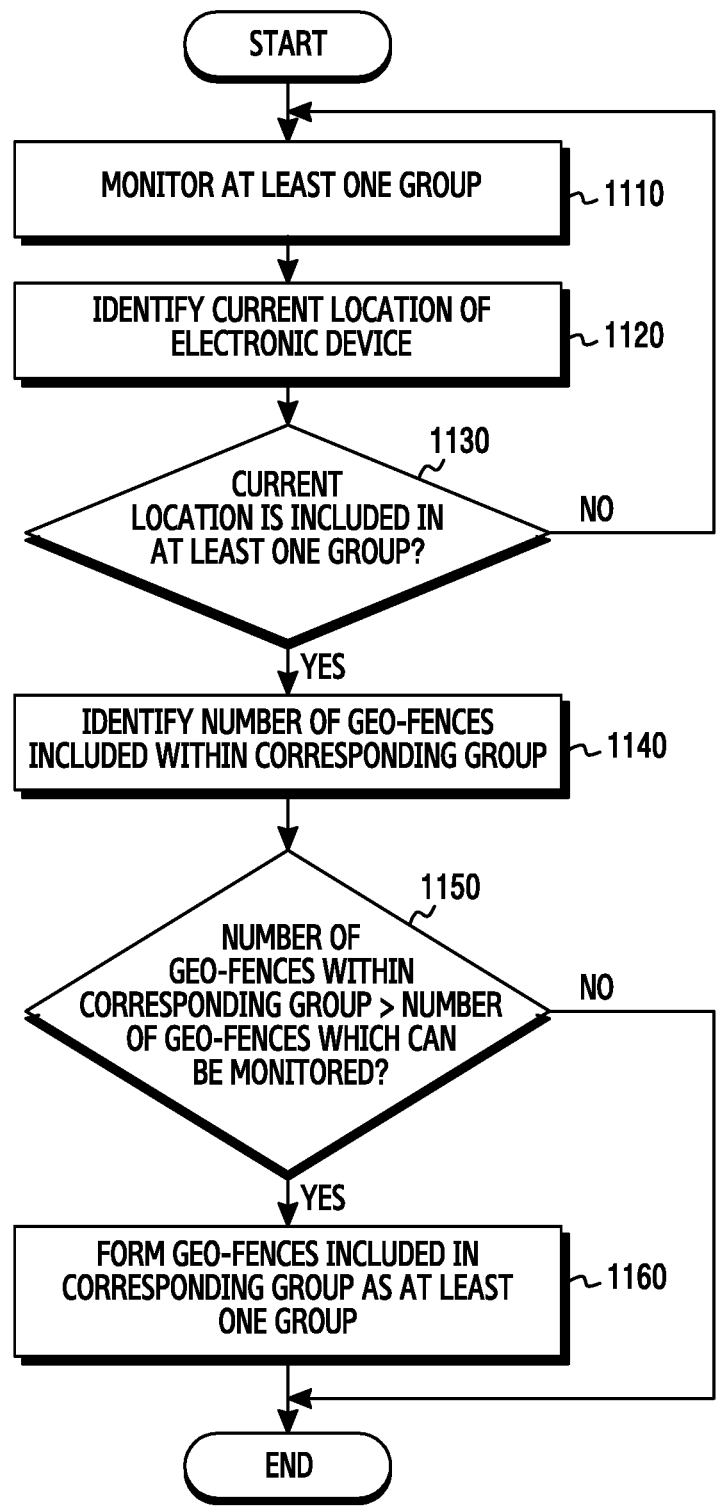
FIG. 11 is a flowchart illustrating a process for forming a lower group within the higher group of the geo-fence according to one embodiment of the present disclosure.

FIG. 11 is a flowchart illustrating a process for forming a sub-group within the larger group of the geo-fence according to an embodiment of the present disclosure. FIG. 11 is a flowchart illustrating a method of forming a sub-group for at least one larger group after operation 1030 of FIG. 10 for forming at least one larger group.

In operation 1110, the electronic device 400 may monitor at least one larger group (for example, the group formed in operation 1030 of FIG. 10).

In operation 1120, the electronic device 400 may identify a current location of the electronic device 400.

In operation 1130, the electronic device 400 may identify whether the current location of the electronic device 400 is included in one of at least one larger group to be monitored.

According to an embodiment, when the current location of the electronic device 400 is not included in one of at least one larger group to be monitored, the electronic device 400 may continuously monitor at least one larger group. For example, when the electronic device 400 does not enter any one larger group, the electronic device 400 may continuously monitor at least one larger group in operation 1110.

When the current location of the electronic device 400 is included in one of at least one larger group to be monitored, the electronic device 400 may identify the number of geo-fences included in the group in order to detect geo-fences included in the larger group in which the electronic device 400 is located in operation 1140.

In operation 1150, the electronic device 400 may compare the number of geo-fences included in the group and the number of geo-fences which can be monitored in order to determine whether to form a sub-group. For example, when the number of geo-fences included in the larger group is larger than the number of geo-fences which can be monitored, the electronic device 400 may determine that not all the geo-fences can be monitored due to the limit of the location identification module 430. Accordingly, the electronic device 400 may determine that the generation of the sub-group is required. The generation of the sub-group may be performed by the database management module 416.

According to an embodiment, when the number of geo-fences included in the group in which the electronic device 400 is located is larger than the number geo-fences which can be monitored, the electronic device 400 may form the sub-group. When the number of geo-fences included in the group in which the electronic device 400 is located is equal or smaller than the number of geo-fences which can be monitored, the electronic device 400 may maintain the monitoring of the larger group.

However, even when the number of geo-fences within the corresponding higher group is equal to or smaller than the number of geo-fences which can be monitored, the electronic device 400 may determine whether the formation of the sub-group is required based on power consumption and resource distribution. When it is determined that the formation of the lower group is required, the electronic device 400 may form the sub-group in operation 1160.

According to an embodiment, it is determined that the formation of the sub-group is required, the electronic device 400 may form geo-fences included in the corresponding higher group as a plurality of lower groups in operation 1160. A method of forming the sub-groups may be the same as the method of forming the larger group (for example, based on latitude/longitude, in the order of distance, or the context-aware scheme).

FIG. 11 illustrates the method by which the electronic device forms sub-groups included in the larger group. When the location of the electronic device 400 is included in one larger group while larger group is monitored, the electronic device 400 may analyze the number of geo-fences and the number of geo-fences which can be registered. When the number of geo-fences included in the corresponding larger group is larger than the number of geo-fences which can be monitored (registered), the electronic device 400 may form sub-groups of geo-fences included in the larger group. Further, when the number of geo-fences included in the larger group is smaller than the number of geo-fences which can be monitored (registered), the electronic device 400 may monitor the larger group and the corresponding geo-fences included in the group.

Figure 12:
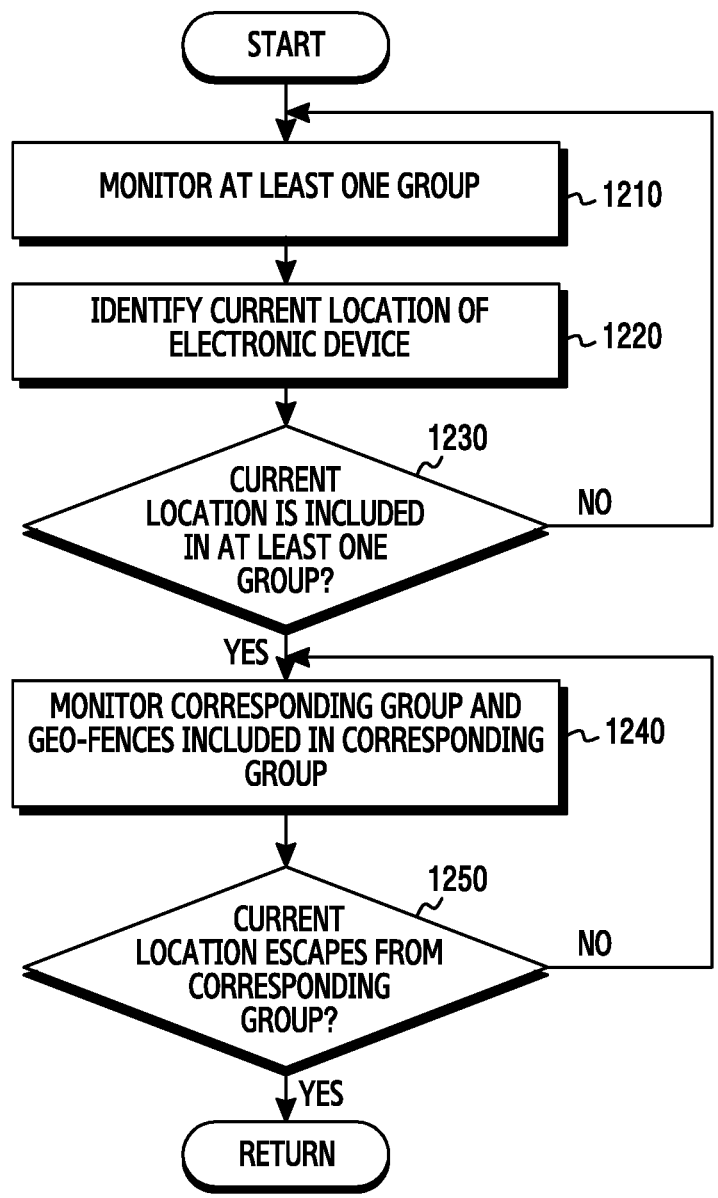
FIG. 12 is a flowchart illustrating a process in which the electronic device monitors geo-fences according to one embodiment of the present disclosure.

FIG. 12 is a flowchart illustrating a process in which the electronic device monitors geo-fences according to one embodiment of the present disclosure. FIG. 12 is a flowchart illustrating an operation of the electronic device 400 when the electronic device 400 stays in any group and then goes out of the group or moves to another group.

According to an embodiment, when the electronic device 400 moves to another group, the electronic device 400 may form a sub-group in the group including the electronic device 400 and monitor the corresponding sub-group and geo-fences included in the group.

In operation 1210, the electronic device 400 may monitor at least one group. As described above, in order to monitor the geo-fences, the electronic device 400 may first form the larger group and then form the sub-group within the larger group as necessary. In this case, the electronic device 400 may monitor both the larger group and the sub-group of the larger group.

In operation 1220, the electronic device 400 may identify a current location of the electronic device 400.

In operation 1230, the electronic device 400 may identify whether the current location of the electronic device 400 is included in one of at least one group currently monitored.

When the electronic device 400 is included in one of at least one group currently monitored, the electronic device 400 may proceed to step 1240.

In operation 1240, the electronic device 400 may monitor the corresponding group in which the electronic device 400 is located and geo-fences included in the group. When the corresponding group and the number of geo-fences included in the group exceed hardware resources, the electronic device 400 may divide the geo-fences as a plurality of sub-groups.

In operation 1250, the electronic device 400 may identify whether the electronic device 400 exits from the current group according to movement of the electronic device 400.

When the electronic device 400 exits from the current group according to the movement of the electronic device 400, the electronic device 400 may monitor at least one group (for example, the larger group) in operation 1210.

When the electronic device 400 maintains the current location or does not exit from the corresponding group, the electronic device 400 may continuously monitor the corresponding group and the geo-fences included in the group in operation 1240.

As described above, in monitoring a plurality of groups, when the current location of the electronic device 400 is included in one of the plurality of groups, the electronic device 400 may monitor the corresponding group and geo-fences included in the group. However, when the location of the electronic device 400 exits from the corresponding group, the electronic device 400 may again monitor the plurality of groups.

Figure 13:
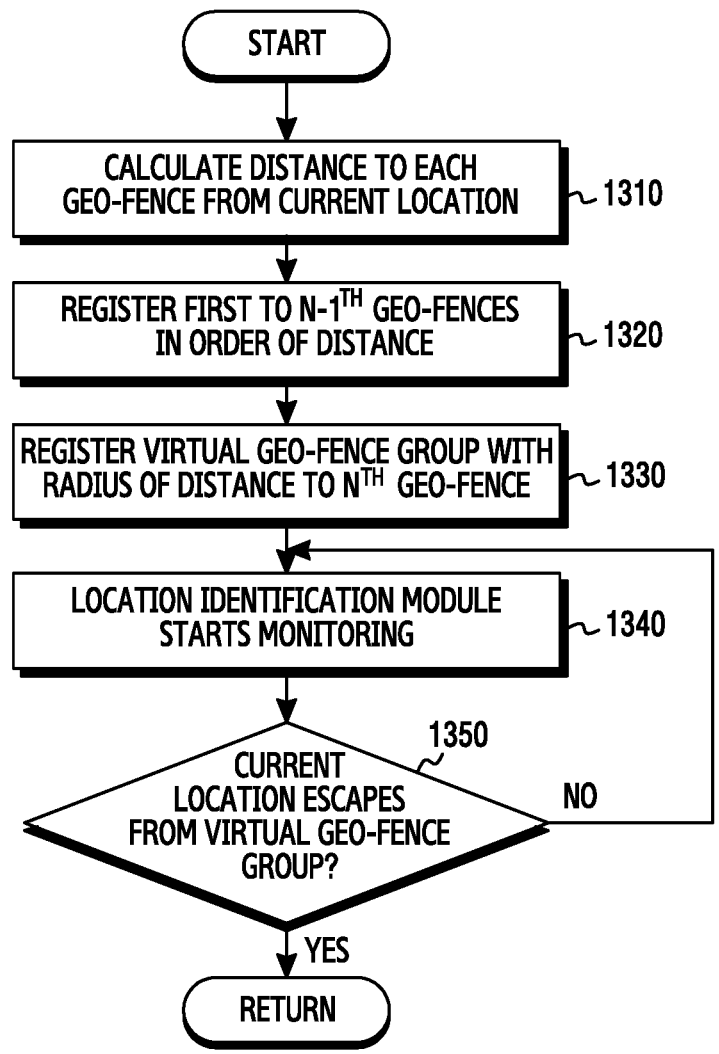
FIG. 13 is a flowchart illustrating a process in which the electronic device forms a geo-fence group according to one embodiment of the present disclosure.

FIG. 13 is a flowchart illustrating a process in which the electronic device forms a geo-fence group according to various embodiments of the present disclosure.

In operation 1310, the electronic device 400 may calculate a distance from a current location of the electronic device 400 to each geo-fence included in the geo-fence list based on at least one piece of geo-fence information (for example, latitude/longitude).

In operation 1320, the electronic device 400 may register N−1 geo-fences up to an N−1$^{th}$ geo-fence sorted by distance from the electronic device 400. For example, when the number of geo-fences which can be monitored (registered) by the electronic device 400 is N, the electronic device 400 may arrange the geo-fences sorted by distance and register the geo-fences up to the N−1th geo-fence as geo-fences to be monitored.

In operation 1330, the electronic device 400 may register a virtual geo-fence group within a radius of a distance between the electronic device 400 and an N$^{th}$ geo-fence furthest in distance from the electronic device 400. For example, the virtual geo-fence group may include the N−1 geo-fences, and the radius of the virtual geo-fence group may be determined by the distance between the electronic device 400 and the N$^{th}$ geo-fence furthest in distance from the electronic device 400.

In operation 1340, the electronic device 400 (for example, the location identification module 430) may start monitoring the geo-fences. For example, when the electronic device 400 is included in the virtual geo-fence group, the location identification module 430 may monitor the virtual geo-fence group and geo-fences within the virtual geo-fence group without re-forming a geo-fence group.

In operation 1350, the electronic device 400 may identify whether the current location of the electronic device 400 is outside of the virtual geo-fence group according to movement of the electronic device 400.

When the current location of the electronic device 400 is outside the virtual geo-fence group, the electronic device 400 may return to operation 1310 and calculate the distance between the electronic device 400 and each geo-fence to repeat the process for forming the geo-fence group. For example, when the electronic device 400 is detected to be outside the virtual geo-fence group by the geo-fence detection module 432, the geo-fence detection module 432 may notify the location detection module 414 in a sleep state of an in/out event. The location detection module 414 having received the in/out event may wake up from the sleep state and calculate again the distance between the current location of the electronic device 400 and each geo-fence to perform again the operation for forming the virtual geo-fence group.

According to an embodiment, the electronic device 400 may form a group based on a distance from the current location of the electronic device 400 to each geo-fence. The electronic device 400 may calculate the distance to each geo-fence whenever measuring the current location of the electronic device 400. When calculating the distance to each geo-fence, the electronic device 400 may calculate a distance to exit the region of the geo-fence when the electronic device is located inside the region (enter state) and calculate a distance to enter the region of the geo-fence when the electronic device 400 is located outside the region (exit state). The electronic device 400 may list N geo-fences corresponding to the limit of the WW resources in an order of closest geo-fence based on geo-fence distances. For example, when N is 6 and a total of 7 geo-fences exist, the electronic device 400 may measure a distance from the current location to each geo-fence and list the geo-fences in an order of closest distance.

Figure 14A:
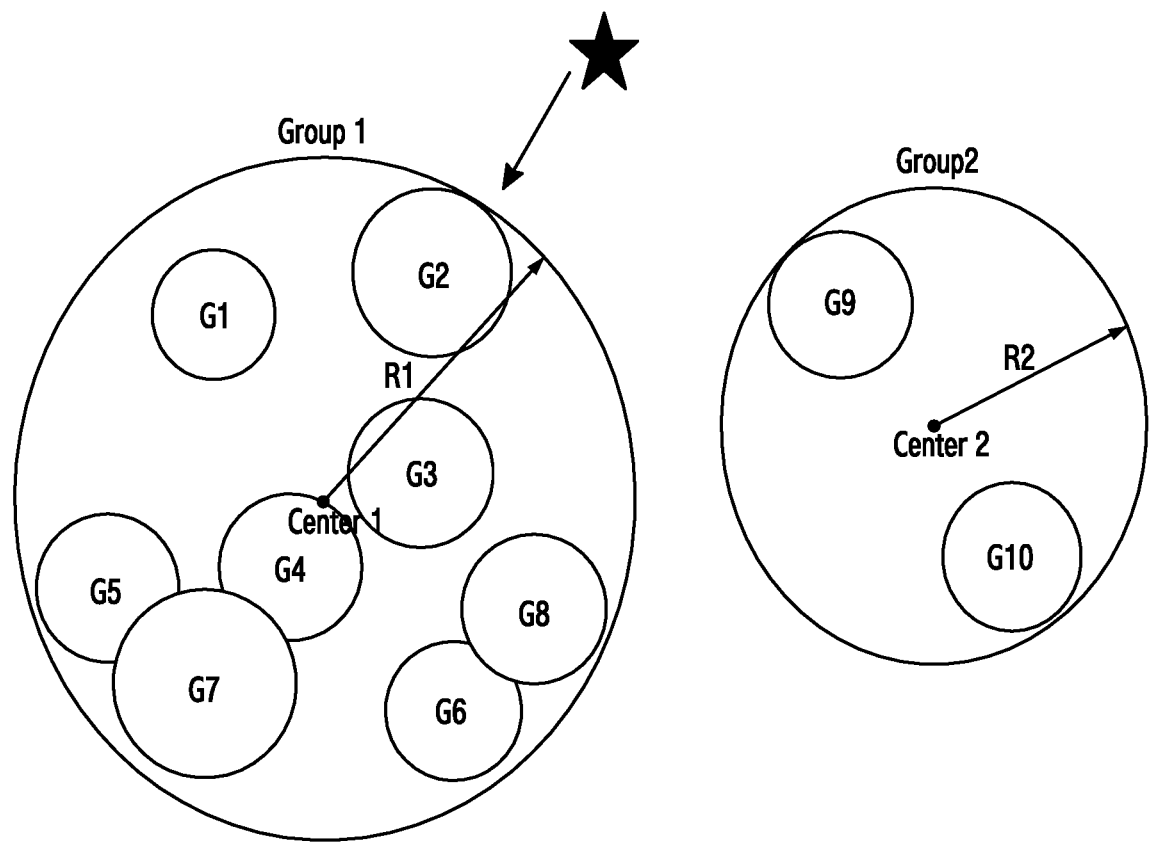
FIG. 14A, FIG. 14B and FIG. 14C illustrate grouping of geo-fences according to one embodiment of the present disclosure.
Figure 14B:
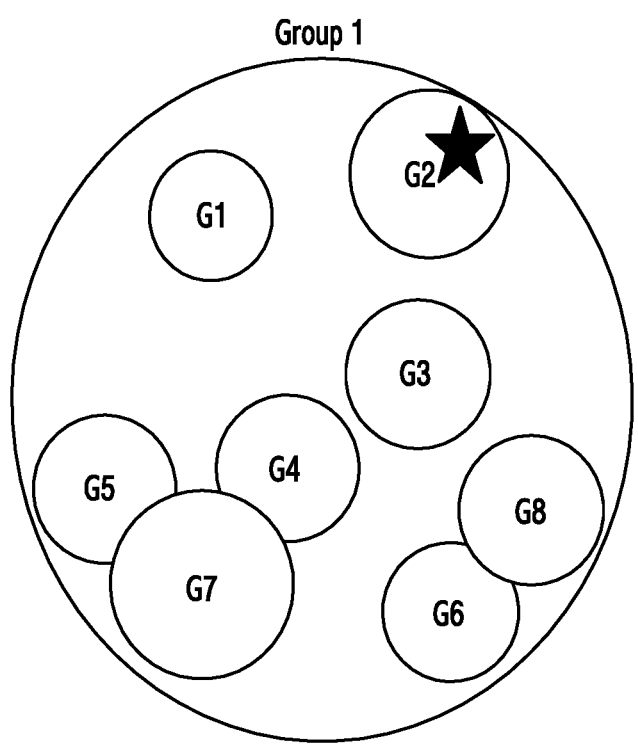
Figure 14C:
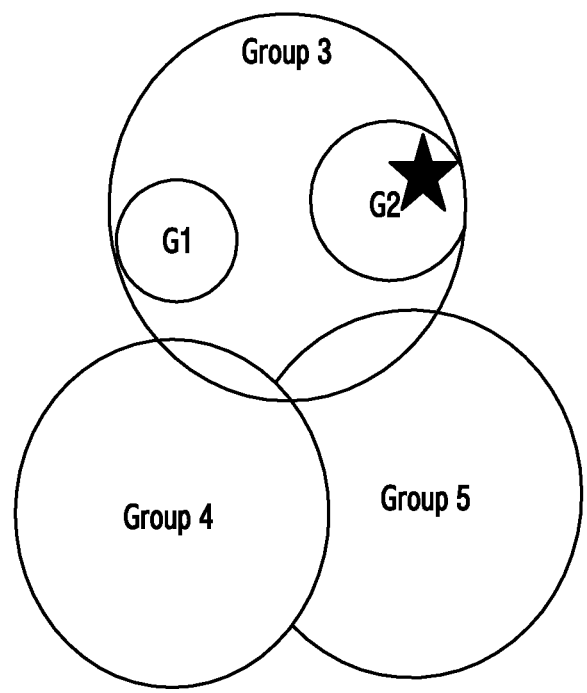

FIGS. 14A to 14C illustrate grouping of geo-fences according to various embodiments of the present disclosure.

According to various embodiments of the present disclosure, the electronic device 400 may group geo-fences by using the context-aware scheme and monitor the grouped geo-fences. For example, a method of independently registering frequently visited geo-fences in the electronic device 400 based on the context-aware scheme without grouping or grouping only the frequency visited geo-fences, registering the grouped geo-fences in the electronic device 400, and monitoring the grouped geo-fences will be described below.

Referring to FIGS. 14A to 14C, when the electronic device 400 is located within group 1, the location detection module 414 may additionally geo-fences (for example, G1 to G8) included in group 1 into groups 3 to 5. For example, group 3 may include geo-fence G1 and geo-fence G2, group 4 may include geo-fence G4, geo-fence G5, and geo-fence G7, and group 5 may include geo-fence G3, geo-fence G6, and geo-fence G8. In this case, the location detection module 414 may assume that the user (for example, the electronic device 400) frequently visits geo-fence G2 and geo-fence G3.

According to an embodiment, when the electronic device 400 located within group 3 escapes from group 3, the location detection module 414 may register groups 3, 4, and 5 as geo-fence groups to be monitored. When an event corresponding to entry of the electronic device 400 into group 5 is generated, the electronic device 400 may register group 5 and geo-fences G3, G8, and G6 as the geo-fences to be monitored again and start monitoring geo-fence G3. At this time, there is no large difference if the user (for example, the electronic device 400) progresses in a direction of group 5 directly from geo-fence G2 but, if the electronic device 400 makes a detour to enter group 5 from geo-fence G2, there may be cumbersomeness to call the location detection module 414 one more time.

In this case, the location detection module 414 may detect visit frequencies of geo-fence G2 and geo-fence G3 and do not group the geo-fences (geo-fences G2 and G3) with other geo-fences.

That is, the electronic device 400 independently register geo-fence G2 and geo-fence G3 in the electronic device 400 or form and manage the geo-fences (geo-fences G2 and G3) as one group, so as to avoid a frequent change in the group to be monitored.

According to various embodiments of the present disclosure, the electronic device 400 may group geo-fences by using both latitude/longitude based scheme and the distance based scheme and monitor the grouped geo-fences.

For example, when group 1 is divided into groups 3, 4, and 5 as illustrated in FIG. 14C, the location identification module 430 may only monitor a maximum of four regions at once, so that the location identification module 430 may lessen burden of the resources. However, when there is no problem of capability even though hardware resources are maximally used, the latitude/longitude based clustering or grouping scheme and the distance based monitoring scheme both be used.

For example, as illustrated in FIG. 14B, at the moment when the user (star shape) first enters group 1, the location detection module 414 may recognize that the number of lower geo-fences of group 1 exceeds 6 hardware resources corresponding to the allowable range. Here, the lower group may be generated based on the latitude/longitude based scheme, but the geo-fences may be grouped and monitored based on the distance based scheme within the range of not exceeding the 6 hardware resources.

Referring to FIG. 14B, the location detection module 414 may register geo-fences G1, G2, G3, and G4 which are close to the user in the location identification module 430, generate a virtual fence having a radius of a distance to geo-fence G8 which is next closest, and register the generated virtual fence at the remaining one position. The location identification module 430 may monitor in real time group 1, geo-fences G1, G2, G3, and G4, and the virtual fence.

When the user (for example, the electronic device 400) moves and the location identification module 430 detects that the current location of the electronic device 400 escapes from the virtual fence, the location detection module 414 may arrange lower geo-fences of group 1 according to an order of distance from the current location, select 4 geo-fences (N−2 geo-fences), and form again a new virtual fence with a radius of a distance of an 5th geo-fence.

According to various embodiments of the present disclosure, at least one geo-fence is added or deleted from the geo-fence list, the electronic device 400 may form and monitor a new group in a new geo-fence list.

Referring to FIGS. 14A to 14C, a client application using the location detection module 414 may make a request for adding a new geo-fence or deleting the existing geo-fence. When the geo-fence is added, the electronic device 400 is required to form a new group. When the geo-fence is deleted, the electronic device 400 may be not required to monitor the geo-fence.

For example, when geo-fence G7 or geo-fence G8 is deleted from group 4 or 5 having three or more geo-fences, a range of the group may be reduced and latitude/longitude of the center, which is the center of the group, and a radius of the group may be changed. However, when geo-fence G1 is deleted from group 3, group 3 may be equated to geo-fence G2. Accordingly, group 3 may be deleted, and geo-fence G2 may be monitored at the same level as groups 4 and 5. Further, when three or more lower geo-fences of group 1 are deleted, the number of geo-fences meet 6 hardware resources corresponding to the resource limit, so that all groups 3, 4, and 5 may be deleted and only group 1 may be managed. At this time, the center and radius of the group may be newly defined.

Similarly, the client application may be added or a geo-fence to be monitored may be added by a request. For example, when four geo-fences are added to group 2 in FIG. 14A, the electronic device 400 should monitor a total of 7 regions including group 2 if the electronic device 400 enters the region of group 2. Accordingly, the electronic device 400 may form a new sub-group of group 2.

Further, when at least one geo-fence is added or deleted from the geo-fence list, the electronic device 400 may configure a threshold value of the geo-fence list, and group the geo-fences only when at least one geo-fence is added or deleted and the number of added or deleted geo-fences exceeds the threshold value.

For example, it is required to form a new group when at least one geo-fence is added or deleted from the geo-fence list. When the electronic device 400 frequently groups the geo-fences, power consumption may increase. Accordingly, the electronic device 400 needs to group the geo-fences in the new geo-fence list only when the geo-fences exceed a predetermined threshold value. The threshold value may be determined according to a user's input, or settings or a state of the electronic device.

Figure 15:
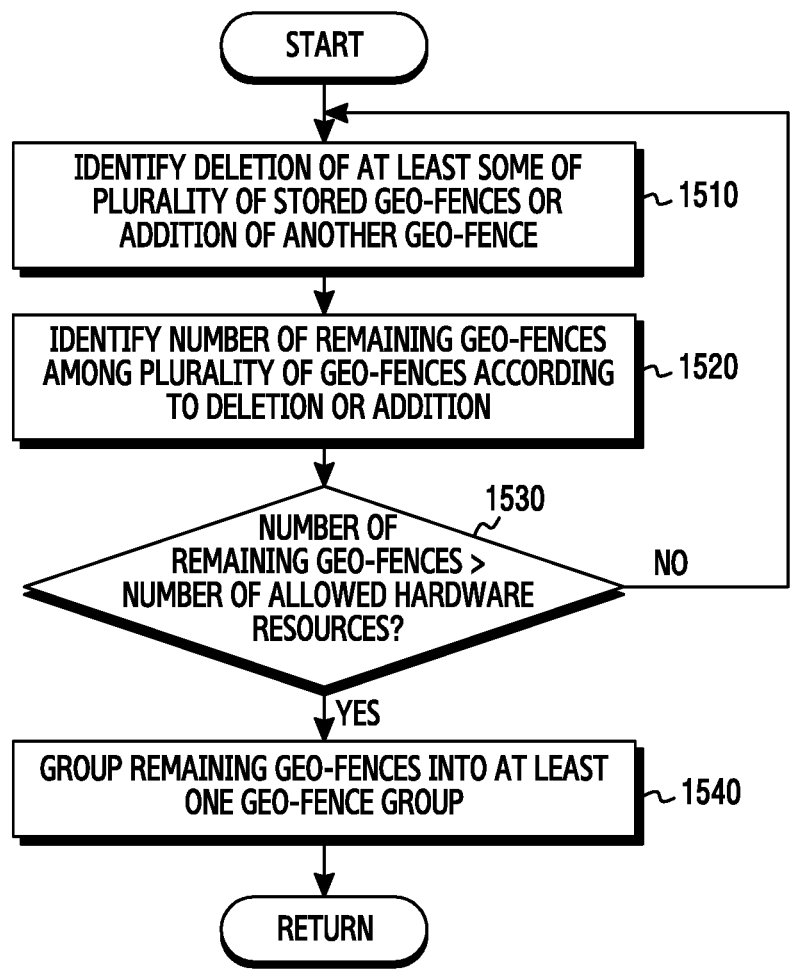
FIG. 15 is a flowchart illustrating a process in which the electronic device groups geo-fences according to one embodiment of the present disclosure.

FIG. 15 is a flowchart illustrating a process in which the electronic device groups geo-fences according to various embodiments of the present disclosure.

The electronic device 400 may store a geo-fence list requested by the application 412 in the second memory 450 or the server 470. A location of the geo-fence may be changed or removed while a service for the geo-fence is provided. In this case, the application 412 may make a request for deleting some geo-fences in the existing geo-fence list or adding another geo-fence.

In operation 1510, the electronic device 400 may identify that at least some of a plurality of stored geo-fences have been deleted or another geo-fence has been added. For example, in order to identify the deletion of some geo-fences or the addition of the other geo-fence, the application 412 may make a request for a newly updated geo-fence list to the server 470, and the processor 410 may identify deletion or addition of the geo-fence by comparing the existing stored geo-fence list and the updated geo-fence list.

In operation 1520, the electronic device 400 may identify the number of remaining geo-fences among the plurality of geo-fences according to the geo-fence addition or deletion from the existing stored geo-fence list. For example, the processor 410 may identify the number of remaining geo-fences among the plurality of geo-fences by comparing the updated geo-fence list requested by the application and the existing geo-fence list.

In operation 1530, the electronic device 400 may compare the number of remaining geo-fences and the number of geo-fences which can be allowed (registered) in hardware resources (for example, the first memory 434) of the location identification module 430.

When the number of remaining geo-fences is equal to or smaller than the number of geo-fences allowed by the hardware resources, the electronic device 400, the hardware resources are sufficient even though all the remaining geo-fences are registered. Therefore, the monitoring can be continuously performed through the existing method unless new grouping is needed in terms of resource distribution or by a user's request. For example, when the number of remaining geo-fences after the geo-fence addition or deletion is 9 and the number of geo-fences of hardware resources, which can be registered (monitored) is 10, the electronic device 400 may have sufficient hardware resources.

Accordingly, when the number of remaining geo-fences is equal to or smaller than the number of allowed hardware resources in operation 1530, the electronic device 400 may return to operation 1510 and identity the deletion of some geo-fences or the addition of another geo-fence.

When the number of remaining geo-fences is larger than the number of allowed hardware resources, not all the remaining geo-fences can be registered to the hardware, so that the electronic device 400 may be required to newly group the geo-fences. For example, when the number of remaining geo-fences after the geo-fence addition or deletion is 11 and the number of geo-fences of hardware resources, which can be registered (monitored) is 10, the hardware resources are not sufficient, so that the electronic device 400 may be required to group the remaining geo-fences as a new group.

Accordingly, when the number of remaining geo-fences is larger than the number of allowed hardware resources in operation 1530, the electronic device 400 may proceed to operation 1540 to group the remaining geo-fences.

In operation 1540, the electronic device 400 may group the remaining geo-fences into at least one geo-fence group. For example, when the number of remaining geo-fences after the geo-fence addition or deletion is 11 and the number of geo-fences of hardware resources which can be registered (monitored) is 10, not all the remaining 11 geo-fences can be registered, so that the electronic device 400 may group the remaining 11 geo-fences as one geo-fence group and register and monitor only one group, or divide the remaining 11 geo-fences into two or more groups and register and monitor the divided groups.

The electronic device 400 may control the number of geo-fences allowed in the hardware resources according to a user's input or settings or a state of the electronic device. For example, this is because the user may desire to determine the number of geo-fences to be grouped by his/herself, or it may be required to control the number of geo-fences which can be allowed in the hardware resources according to a use state of the electronic device or a memory occupancy state of the application.

According to various embodiments of the present disclosure, an operation method of an electronic device may include identifying a plurality of geo-fences and a limit of geo-fences that can be monitored by the electronic device, forming at least a first group of geo-fences comprising a first subset of the identified plurality of geo-fences, and monitoring by the electronic device only the first subset of geo-fences in the group.

According to an embodiment, the number of geo-fences which can be allowed by the hardware resources may be set by a user's input or according to settings or a state of the electronic device.

In the operation method of the electronic device, the geo-fences of the one or more geo-fence groups which have been grouped, may be monitored. In the monitoring, when the electronic device approaches a region corresponding to a plurality of larger geo-fence groups, the one larger geo-fence group may be classified into a plurality of sub-geo-fence groups based on the approaching to the region corresponding to one of the plurality of larger geo-fence groups and the plurality of sub-geo-fence groups may be monitored, and the plurality of geo-fences may be classified into the plurality of larger geo-fence groups based on location information of latitude and longitude.

According to the operation method of the electronic device, in the monitoring, a virtual geo-fence may be monitored and, when the electronic device escapes from the virtual geo-fence, another virtual geo-fence to be monitored among a plurality of geo-fences may be determined, and the other virtual geo-fence may determine first candidates to be monitored among the plurality of geo-fences based on current location information of the electronic device and generate the first candidate including a current location corresponding to the electronic device and the determined first candidates.

According to an embodiment, the first geo-fence group and/or at least one geo-fence included in in the first geo-fence group may be monitored when the electronic device is located in one of the one or more geo-fence groups (first geo-fence group), and the plurality of geo-fences may be re-grouped as one or more geo-fence groups when the electronic device escapes from the first geo-fence group. In the re-grouping of the geo-fence groups, a current location of the electronic device may be acquired, a distance between the current location and each geo-fence may be calculated, based on the calculated distance and/or a number of geo-fences which can be monitored, at least one geo-fence which meets the number of geo-fences which can be monitored may be re-grouped in a nearest order from the current location as one geo-fence group, and the geo-fence group may be monitored. A distance from the electronic device to a point where the electronic device comes to escape from a geo-fence range may be calculated when the electronic device is located inside the geo-fence range, and a distance from the electronic device to a point where the electronic device comes to enter the geo-fence range may be calculated when the electronic device is located outside the geo-fence range.

According to various embodiments of the present disclosure, the electronic device may include two processors. One processor may monitor geo-fences of the grouped geo-fence group and the other processor may re-form a geo-fence group based on a monitoring result.

According to various embodiments of the present disclosure, computer-readable recording medium having a program recorded therein may identify a plurality of geo-fences and a limit of geo-fences that can be monitored by the electronic device, form at least a first group of geo-fences comprising a first subset of the identified plurality of geo-fences, and monitor by the electronic device only the first subset of geo-fences in the group.

An electronic device and an operation method thereof according to various embodiments of the present disclosure may group a plurality of geo-fences and manage the grouped geo-fences, thereby avoiding monitoring of an unnecessary region (for example, geo-fence) and selectively monitoring a geo-fence which should be necessarily monitored. Therefore, it is possible to minimize the use of memories and hardware resources and wake up the processor as little as possible so as to reduce power consumption.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. A method of an electronic device, the method comprising:
   identifying information regarding a plurality of geo-fences stored in the electronic device, the information comprising a number of the plurality of geo-fences and location information for each of the plurality of geo-fences;
   identifying a number of geo-fences which are available by hardware resources;
   in response to determining that the number of the plurality of geo-fences is larger than the number of geo-fences which are available by the hardware resources, grouping the plurality of geo-fences into one or more geo-fence groups based on the location information for each of the plurality of geo-fences, wherein a number of the one or more geo-fence groups is less than or equal to the number of geo-fences which are available by the hardware resources;
   generating one or more virtual geo-fences corresponding to the one or more geo-fence groups; and
   monitoring the one or more virtual geo-fences.

2. The method of claim 1, further comprising:
   in response to detecting that the electronic device enters one virtual geo-fence among the one or more virtual geo-fences, monitoring the one virtual geo-fence and one or more geo-fences within the one virtual geo-fence.

3. The method of claim 2, further comprising:
   identifying a number of the one or more geo-fences within the one virtual geo-fence;
   in response to determining that the number of the one or more geo-fences within the one virtual geo-fence is larger than the number of geo-fences which are available by the hardware resources, sub-grouping the one or more geo-fences within the one virtual geo-fence into one or more sub-groups; and
   monitoring one or more virtual geo-fences corresponding to the one or more sub-groups.

4. The method of claim 2, further comprising:
in response to detecting that the electronic device exits from the one virtual geo-fence, re-grouping the plurality of geo-fences into one or more geo-fence groups.

5. The method of claim 4, wherein the re-grouping the plurality of geo-fences further comprises:
acquiring a location of the electronic device;
determining a distance between the location of the electronic device and each of the plurality of geo-fences;
generating another group of geo-fences comprising at least one geo-fence among the plurality of geo-fences based on the distance,
wherein a number of the at least one geo-fence included in the another group is less than or equal to the number of geo-fences which are available by the hardware resources; and
monitoring the another group.

6. The method of claim 2, further comprising:
providing a notification when the electronic device crosses boundaries of the one or more geo-fences within the one virtual geo-fence.

7. The method of claim 1, wherein the location information comprises data regarding longitude and latitude of each of the plurality of geo-fences; and
wherein each of the one or more geo-fence groups is configured with geo-fences located within a designated latitude range and a designated longitude range.

8. The method of claim 1, wherein the electronic device comprises a first processor and a second processor, and
wherein the identifying of the information regarding the plurality of geo-fences, the identifying of the number of the geo-fences which are available by hardware resources, the grouping of the plurality of geo-fences, and the generating of the one or more virtual geo-fences are controlled by the first processor, and
wherein the monitoring of the one or more virtual geo-fences is controlled by the second processor.

9. The method of claim 1, wherein the number of geo-fences which are available by the hardware resources is determined by a user's input.

10. The method of claim 1, wherein the number of geo-fences which are available by the hardware resources is adaptively changed based on settings or a state of the electronic device.

11. An electronic device comprising:
one or more processors configured to:
identify information regarding a plurality of geo-fences stored in the electronic device, the information comprising a number of the plurality of geo-fences and location information for each of the plurality of geo-fences;
identify a number of geo-fences which are available by hardware resources;
in response to determining that the number of the plurality of geo-fences is larger than the number of geo-fences which are available by the hardware resources, group the plurality of geo-fences into one or more geo-fence groups based on the location information for each of the plurality of geo-fences, wherein a number of the one or more geo-fence groups is less than or equal to the number of geo-fences which are available by the hardware resources;
generate one or more virtual geo-fences corresponding to the one or more geo-fence groups; and
monitor the one or more virtual geo-fences.

12. The electronic device of claim 11, wherein the one or more processors are further configured to:

in response to detecting that the electronic device enters one virtual geo-fence among the one or more virtual geo-fences, monitor the one virtual geo-fence and one or more geo-fences within the one virtual geo-fence.

13. The electronic device of claim 12, wherein the one or more processors are further configured to:
identify a number of the one or more geo-fences within the one virtual geo-fence;
in response to determining that the number of the one or more geo-fences within the one virtual geo-fence is larger than the number of geo-fences which are available by the hardware resources, sub-group the one or more geo-fences within the one virtual geo-fence into one or more sub-groups; and
monitor one or more virtual geo-fences corresponding to the one or more sub-groups.

14. The electronic device of claim 12, wherein the one or more processors are further configured to:
in response to detecting that the electronic device exits from the one virtual geo-fence, re-group the plurality of geo-fences into one or more geo-fence groups.

15. The electronic device of claim 14, wherein the one or more processors are further configured to:
acquire a location of the electronic device;
determine a distance between the location of the electronic device and each of the plurality of geo-fences;
generate another group of geo-fences comprising at least one geo-fence among the plurality of geo-fences based on the distance,
wherein a number of the at least one geo-fence included in the another group is less than or equal to the number of geo-fences which are available by the hardware resources; and
monitor the another group.

16. The electronic device of claim 12, wherein the one or more processors are further configured to provide a notification when the electronic device crosses boundaries of the one or more geo-fences within the one virtual geo-fence.

17. The electronic device of claim 11, wherein the location information comprises data regarding longitude and latitude of each of the plurality of geo-fences; and
wherein each of the one or more geo-fence groups is configured with geo-fences located within a designated latitude range and a designated longitude range.

18. The electronic device of claim 11, wherein the one or more processors comprise a first processor and a second processor, and
wherein the first processor is configured to:
identify the information regarding the plurality of geo-fences stored in the electronic device;
identify the number of geo-fences which are available by hardware resources;
in response to determining that the number of the plurality of geo-fences is larger than the number of geo-fences which are available by the hardware resources, group the plurality of geo-fences into the one or more geo-fence groups; and
generate one or more virtual geo-fences corresponding to the one or more geo-fence groups; and
wherein the second processor is configured to monitor the one or more virtual geo-fences.

19. The electronic device of claim 18, wherein the first processor is capable of operating in a normal power mode, and
wherein the second processor is capable of operating in a lower power mode and the normal power mode.

20. A non-transitory computer readable storage medium for storing one or more programs for executing an operation of:
- identifying information regarding a plurality of geo-fences stored in an electronic device, the information comprising a number of the plurality of geo-fences and location information for each of the plurality of geo-fences;
- identifying a number of geo-fences which are available by hardware resources;
- in response to determining that the number of the plurality of geo-fences is larger than the number of geo-fences which are available by the hardware resources, grouping the plurality of geo-fences into one or more geo-fence groups based on the location information for each of the plurality of geo-fences, wherein a number of the one or more geo-fence groups is less than or equal to the number of geo-fences which are available by the hardware resources;
- generating one or more virtual geo-fences corresponding to the one or more geo-fence groups; and
- monitoring the one or more virtual geo-fences.

\* \* \* \* \*